US008016087B2

(12) United States Patent (10) Patent No.: US 8,016,087 B2
Murakami et al. (45) Date of Patent: Sep. 13, 2011

(54) FLUID DAMPER

(75) Inventors: Takahiro Murakami, Chiba (JP); Hideo Araseki, Chiba (JP)

(73) Assignee: Central Research Institute of Electrical Power Industry, Tokyo (JP)

( * ) Notice: Subject to any disclaimer, the term of this patent is extended or adjusted under 35 U.S.C. 154(b) by 546 days.

(21) Appl. No.: 12/162,862

(22) PCT Filed: Feb. 9, 2007

(86) PCT No.: PCT/JP2007/000078
§ 371 (c)(1),
(2), (4) Date: Jul. 31, 2008

(87) PCT Pub. No.: WO2007/091399
PCT Pub. Date: Aug. 16, 2007

(65) Prior Publication Data
US 2009/0050425 A1 Feb. 26, 2009

(30) Foreign Application Priority Data

Feb. 9, 2006 (JP) ................................. 2006-032724
Mar. 31, 2006 (JP) ................................. 2006-099661
Mar. 31, 2006 (JP) ................................. 2006-100220

(51) Int. Cl.
*F16F 15/03* (2006.01)
*F16F 9/53* (2006.01)
(52) U.S. Cl. ..................................... 188/267; 188/267.2
(58) Field of Classification Search .................. 188/267, 188/267.1, 267.2; 267/140.14, 140.15
See application file for complete search history.

(56) References Cited

U.S. PATENT DOCUMENTS

| 6,390,253 B1 * | 5/2002 | Oliver .......................... 188/267.2 |
| 2004/0012134 A1 | 1/2004 | Fujita et al. |
| 2004/0154524 A1 | 8/2004 | Fedders |

FOREIGN PATENT DOCUMENTS

| EP | 1355082 A1 | 10/2003 |
| JP | 59184004 A * | 10/1984 |
| JP | 07-190128 A | 7/1995 |
| JP | 08-109941 A | 4/1996 |
| JP | 2002-127727 | 5/2002 |
| JP | 2004-316797 A | 11/2004 |
| JP | 2005-291284 A | 10/2005 |
| JP | 2005-291338 A | 10/2005 |

OTHER PUBLICATIONS

S. Rakheja "Vibration and Shock Insolation Performance of a Semi-Active "On-Off" Damper", American Society of Mechanical Engineers, Journal of Vibration, Acoustics, Stress, and Reliability in Design 107, pp. 398-403, 1985.
Kenji Yokuda et al., "A Study of a Passive Type MR Damper Whose Damping Characteristic Has Amplitude Dependence", Conference Proceedings of the Japan Society of Mechanical Engineers Kyushu Branch. The 57th Term, No. 048-1, pp. 445-446, Mar. 2004.

* cited by examiner

*Primary Examiner* — Thomas J Williams
(74) *Attorney, Agent, or Firm* — Notaro, Michalos & Zaccaria P.C.

(57) ABSTRACT

In a fluid damper that autonomously changes a damping force in accordance with movement of a piston, the fluid damper having: a fluid 8 having magnetic properties; a piston 2 formed of a magnetic material; a cylinder 3 that encapsulates the fluid 8 having magnetic properties and accommodates the piston 2; a piston rod 4 that pierces the cylinder 3 to support the piston 2; a magnetic field generation device 6 provided outside the cylinder 3; a first yoke 5 arranged around the cylinder 3; and a second yoke 7 arranged around the piston rod 4 outside the cylinder 3, a magnetic circuit is partially formed.

8 Claims, 14 Drawing Sheets

FLUID DAMPER

TECHNICAL FIELD

The present invention relates to a damper that uses a fluid having magnetic properties as a working fluid. More particularly, the present invention relates to a fluid damper that is preferable to be used as, e.g., a seismic isolation damper for structures.

BACKGROUND ART

As a conventional damper that uses a fluid having magnetic properties as a working fluid, there is known one having: a cylinder 101; a piston 102; a first fluid chamber 103 and a second fluid chamber 104 partitioned in the cylinder 101 by the piston 102; a magneto-rheological fluid 105 filling the first fluid chamber 103 and the second fluid chamber 104; an electromagnet 108 formed of a coil obtained by winding an electric wire around a groove portion 102a formed on an outer periphery of the piston 102; and an external power feed control device 110 that supplies an electric power to the electromagnet 108 through a wiring line 109, wherein the power feed control device 110 feeds an electric power to the electromagnet 108 to form a magnetic field in a fluid-flow path 107 and a fluid flow resistance of the magneto-rheological fluid 105 passing through the fluid-flow path 107 is increased by a function of this magnetic field to adjust a damping force of the damper as shown in FIG. 18.

Patent Document 1: Japanese Patent Application Laid-open No. 2004-316797

Further, in damping force control of a conventional damping force control type damper that is also called a semi-active damper including a sensor that measures a displacement amount or a speed of a piston and a control device that controls a coil voltage in real time based on measurement data from the sensor, a control method of intensifying a damping force when the damper is effective for suppressing vibrations and weakening the damping force when the damper is not effective for suppressing vibrations is extensively used. Specifically, assuming that one side in a cylinder axial direction is positive and the other side in the same is negative in regard to a relative speed Vr and a relative displacement amount Xr of the piston with respect to the cylinder, there is considered, e.g., a control rule that the damping force is maximized in a case where a direction of relative movement of the piston with respect to the cylinder is different from a direction of displacement from a neutral position when the piston remains in an initial setting state and is in a standby mode without being displaced, i.e., in a case where Vr>0 and Xr<0, or Vr<0 and Xr>0, and also Vr×Xr<0, and that the damping force is minimized in a case where a direction of relative movement of the piston with respect to the cylinder is the same as a direction of displacement from the neutral position, i.e., in a case where Vr>0 and Xr>0, or Vr<0 and Xr<0, and also Vr×Xr>0 (S. Rakheja: Vibration and Shock Isolation Performance of a Semi-Active "On-Off" Damper, American Society of Mechanical Engineers, Journal of Vibration, Acoustics, Stress, and Reliability in Design 107, pp. 398-403, 1985). When the damping force is adjusted by using a relationship between a relative speed and a relative displacement amount of the piston with respect to the cylinder in this manner, the damper can demonstrate an excellent damping effect.

DISCLOSURE OF INVENTION

However, the conventional damper requires a sensor that senses displacement of the piston and a control device that controls an electric power supplied to the coil in real time in accordance with displacement of the piston based on a signal from the sensor in order to control/adjust the damping force. Therefore, when the sensor or the control device fails to operate, since the damping force cannot be adjusted, predetermined performances cannot be demonstrated, and hence it cannot be said that reliability is high.

Furthermore, in the conventional damper, a control command must be issued from the control device and the electric power must be supplied, and the damper alone cannot independently operate while adjusting the damping force. Therefore, the control device must be set in a constantly operating state, i.e., a power supply ON state irrespective of presence/absence of operations, and this is uneconomical when a standby mode continues for a long time or the operation is continuously performed for a long time. Therefore, for example, it cannot be said that this damper is suitable to be applied to a damping apparatus that is continuously in the standby mode for a long time and must assuredly operate with respect to an earthquake that has suddenly occurred to demonstrate predetermined performances like a seismic isolation damper for structures.

It is, therefore, an object of the present invention to provide a fluid damper that can autonomously change a damping force in accordance with movement of a piston to operate without providing a sensor that senses displacement of a piston or a control device that controls supply of an electric power.

Moreover, it is an object of the present invention to provide a fluid damper that can demonstrate an excellent damping effect by using a relationship between a relative speed and a relative displacement amount of a piston with respect to a cylinder to adjust a damping force. To achieve this object, there is provided a fluid damper comprising: a fluid having magnetic properties, a piston formed of a magnetic material; a cylinder which encapsulates the fluid having magnetic properties and accommodates the piston; a piston rod which pierces end face members of the cylinder in an axial direction to support the piston; a magnetic field generation device provided outside the cylinder; a first yoke which is arranged around the cylinder and magnetically connects the piston with the magnetic field generation device; and a second yoke which is arranged around the piston rod outside the cylinder and magnetically connects the piston rod with the magnetic field generation device, wherein the piston rod has: a magnetic portion which forms a first magnetic circuit together with the piston, the first yoke, the magnetic field generation device, and the second yoke when the piston is displaced to one side in the axial direction beyond a neutral region; a magnetic portion which forms a second magnetic circuit together with the piston, the first yoke, the magnetic field generation device, and the second yoke when the piston is displaced to the other side in the axial direction beyond the neutral region; and a non-magnetic portion which cuts off the first magnetic circuit and the second magnetic circuit when the piston is in the neutral region, and a magnetic flux density of each magnetic circuit passing through a gap between an outer peripheral surface of the piston and an inner peripheral surface of the cylinder varies in accordance with movement of the piston in the axial direction. It is to be noted that the gap between the outer peripheral surface of the piston and the inner peripheral surface of the cylinder will be referred to as an orifice.

Therefore, according to this fluid damper, when the magnetic field generation device generates a magnetic field and a vibration force is applied to the piston rod to displace the piston in the axial direction, passability of the magnetic flux between the second yoke and each magnetic portion of the piston rod varies, and the magnetic flux density of each magnetic circuit passing through the orifice changes. As a result, a magnitude of the magnetic field applied to the fluid having the magnetic properties in the orifice portion can be changed to vary a fluid flow resistance in proportion to the magnitude of the magnetic field. Therefore, this fluid damper can operate while autonomously changing the damping force in accordance with movement of the piston without using the sensor that senses displacement of the piston or the control device that controls the electric power supplied to the magnetic field generation device.

Specifically, when a displacement amount is small and the piston is in the neutral region, the non-magnetic portion of the piston rod faces the second yoke to serve as a gap on the magnetic circuit. Therefore, the magnetic circuit passing through a space between the piston and the first yoke is not formed at all or has a low magnetic flux density, the magnetic field is hardly applied to the fluid having the magnetic properties near the piston peripheral surface, which is specifically the orifice portion, and the fluid flow resistance hardly varies. Therefore, the damping effect is demonstrated as a fluid damper having a damping force close to a damping force based on the fundamental fluid flow resistance of the fluid. Here, the fundamental fluid flow resistance of the fluid means a fluid flow resistance of a fluid having magnetic properties in a state where no magnetic field is applied.

On the other hand, when a displacement amount is large and the piston moves to the outside of the neutral region, since the second yoke moves closer to or faces each magnetic portion of the piston rod, the magnetic circuit passing through a space between the piston or one of a pair of pistons and the first yoke is formed, and the magnetic flux density passing through the magnetic circuit is increased to raise the magnetic field applied to the fluid having the magnetic properties near the piston peripheral surface. As a result, the fluid flow resistance in the orifice portion is further increased to raise the damping force of the fluid damper, and the fluid damper demonstrates the strong damping effect. Therefore, this fluid damper demonstrates the damping effect as a damper having a damping force of a simple fluid damper when the piston is in the neutral region, and it demonstrates the strong damping effect as a damper having an intensive damping force when the piston moves beyond the neutral region. That is, this fluid damper has a combination of the two different types of damping forces, and functions as a damper that demonstrates the two damping effects.

Here, the neutral region means a range in which the fluid damper according to the present invention demonstrates a damping force close to that based on the fundamental fluid flow resistance of the fluid without being affected by an increase in the fluid flow resistance due to formation of the magnetic circuit when the piston is displaced. Additionally, this range is arbitrarily determined depending on an arrangement relationship between the second yoke and each magnetic portion of the piston rod. It is to be noted that the neutral region does not have to be a central portion of the cylinder and it may be set as a portion that is biased to one of sides of the cylinder in an axial direction as an initial setting.

Further, as the fluid having the magnetic properties used in the present invention, a fluid which has a ferromagnetic material dispersed like a collide in a solution and whose fluid flow resistance varies depending on a magnitude of the magnetic field applied thereto can suffice, and a type of the solution and a type or a particle diameter of the ferromagnetic material are not restricted in particular, but this fluid is preferably a turbid liquid with a high concentration containing ferromagnetic metal particles each having a particle diameter of approximately 1 to 10 μm. Specifically, it is, e.g., a magneto-rheological fluid or a magnetic fluid.

Furthermore, although this fluid damper is a damping force control type damper, it can operate while autonomously changing a damping force in accordance with movement of the piston without receiving an external control command, thereby improving the reliability of the fluid damper.

Moreover, according to the present invention, in the fluid damper, the piston formed of a magnetic material is constituted of at least a pair of first and second pistons formed of a magnetic material which are arranged to face each other through a non-magnetic material with a gap therebetween in the axial direction, and the first and second pistons formed of a magnetic material have bypasses allowing the fluid having magnetic properties to flow therethrough only in directions opposite to each other.

Additionally, in the fluid damper, a cylinder chamber of the cylinder is partitioned by the pair of pistons into a first cylinder chamber, a second cylinder chamber, and a third cylinder chamber sandwiched between the pair of pistons, the first piston on the first cylinder chamber side includes a valve allowing the fluid having magnetic properties to flow only in a direction from the first cylinder chamber to the third cylinder chamber at the bypass allowing the first cylinder chamber to communicate with the third cylinder chamber, the second piston on the second cylinder chamber side includes a valve allowing the fluid having magnetic properties to flow only in a direction from the second cylinder chamber to the third cylinder chamber at the bypass allowing the second cylinder chamber to communicate with the third cylinder chamber, and the piston rod has: a magnetic portion which forms a first magnetic circuit together with the first piston, the first yoke, the magnetic field generation device, and the second yoke when the first piston is displaced toward the first cylinder chamber side beyond a neutral region; a magnetic portion which forms a second magnetic circuit together with the second piston, the first yoke, the magnetic field generation device, and the second yoke when the second piston is displaced toward the second cylinder chamber side beyond the neutral region; and a non-magnetic portion which cuts off the first magnetic circuit when the first piston is in the neutral region and cuts off the second magnetic circuit when the second piston is in the neutral region.

Further, in the fluid damper, a cylinder chamber of the cylinder is partitioned by the pair of pistons into a first cylinder chamber, a second cylinder chamber, and a third cylinder chamber sandwiched between the pair of pistons, the first piston on the first cylinder chamber side includes a valve allowing the fluid having magnetic properties to flow only in a direction from the third cylinder chamber to the first cylinder chamber at the bypass allowing the first cylinder chamber to communicate with the third cylinder chamber, the second piston on the second cylinder chamber side includes a valve allowing the fluid having magnetic properties to flow only in a direction from the third cylinder chamber to the second cylinder chamber at the bypass allowing the second cylinder chamber to communicate with the third cylinder chamber, and the piston rod has: a magnetic portion which forms a first magnetic circuit together with the first piston, the first yoke, the magnetic field generation device, and the second yoke when the first piston is displaced toward the first cylinder chamber side beyond a neutral region; a magnetic portion which forms a second magnetic circuit together with the second piston, the first yoke, the magnetic field generation device, and the second yoke when the second piston is displaced toward the second cylinder chamber side beyond the neutral region; and a non-magnetic portion which cuts off the first magnetic circuit when the first piston is in the neutral region and cuts off the second magnetic circuit when the second piston is in the neutral region.

The fluid damper can control a magnitude of the damping force to be demonstrated based on a relationship between a relative speed, i.e., a direction of movement of each piston with respect to the cylinder and a relative displacement amount, i.e., a direction of displacement from the neutral position by forming the magnetic circuits passing through different pistons in the pair of pistons depending on functions of the bypass and the valve provided to each one in the pair of pistons and a position where each piston is displaced, thereby demonstrating its excellent performance of attenuating vibration.

Specifically, the fluid damper can perform the following control over the damping force. That is, when the piston moves toward the end portion of the cylinder chamber in the axial direction, the fluid having the magnetic properties is passed through the bypass in which the magnetic circuit on the piston is not formed and the orifice in which the magnetic circuit is not formed to flow to the cylinder chamber on the opposite side, thus demonstrating the small damping force as a simple fluid damper. Furthermore, when a direction of movement of the piston changes in the range exceeding the neutral region, i.e., when a direction of movement of the piston is turned toward the other end portion of the cylinder chamber in the axial direction from a state where the piston is displaced to the one end portion of the cylinder chamber in the axial direction beyond the neutral region, the fluid having the magnetic properties is passed through the bypass and the orifice in which the magnetic circuit is not formed and the orifice in which the magnetic circuit is formed to flow to the cylinder chamber on the opposite side, the magnetic field can be thereby applied to increase the fluid flow resistance and further add the braking force to the intrinsic piston movement in the fluid damper, thus demonstrating the large damping force.

Moreover, the fluid damper can perform the following control over the damping force. That is, when the piston moves toward the end portion of the cylinder chamber in the axial direction beyond the neutral region, the fluid having the magnetic properties is passed through the orifice in which the magnetic circuit is formed and the bypass and the orifice in which the magnetic circuit is not formed to flow to the cylinder chamber on the opposite side, and the magnetic field can be thereby applied to increase the fluid flow resistance and to further add the braking force to the intrinsic piston movement in the fluid damper, thus demonstrating the large damping force. Additionally, when a direction of movement of the piston is turned toward the other end portion of the cylinder chamber in the axial direction from a state where the piston is displaced to the one end portion of the cylinder chamber in the axial direction beyond the neutral region, the fluid having the magnetic properties is passed through the orifice in which the magnetic circuit is not formed and the bypass in which the magnetic circuit is not formed to flow to the cylinder chamber on the opposite side, thus demonstrating the small damping force as a simple fluid damper.

Further, in the fluid damper of the present invention, it is preferable to use a magneto-rheological fluid or a magnetic fluid as the fluid having the magnetic properties.

Furthermore, in the fluid damper of the present invention, it is preferable to use a permanent magnet as the magnetic field generation device. In this case, using the permanent magnet enables generating the magnetic field without receiving supply of the electric power from the outside, and hence the fluid damper can independently operate, thereby improving the reliability.

Moreover, in the fluid damper of the present invention, a solenoid can be also used as the magnetic generation device. In this case, since an intensive magnetic field can be generated from a small device by using the solenoid, the fluid damper can be reduced in size, or the intensive magnetic field can be generated to demonstrate the strong damping force.

Figure 1:
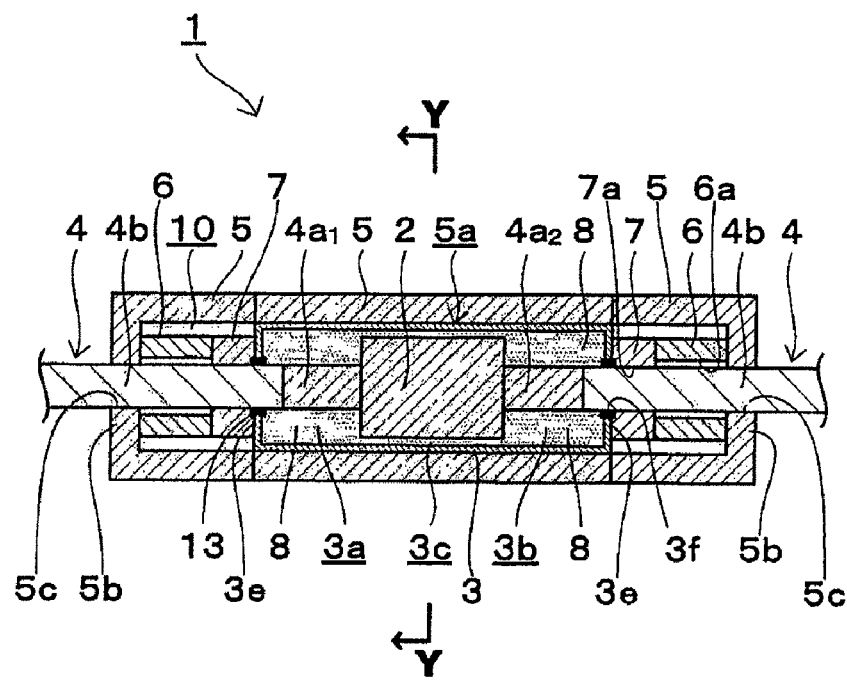
FIG. 1 is a cross-sectional view showing a first embodiment of a fluid damper according to the present invention.
Figure 2:
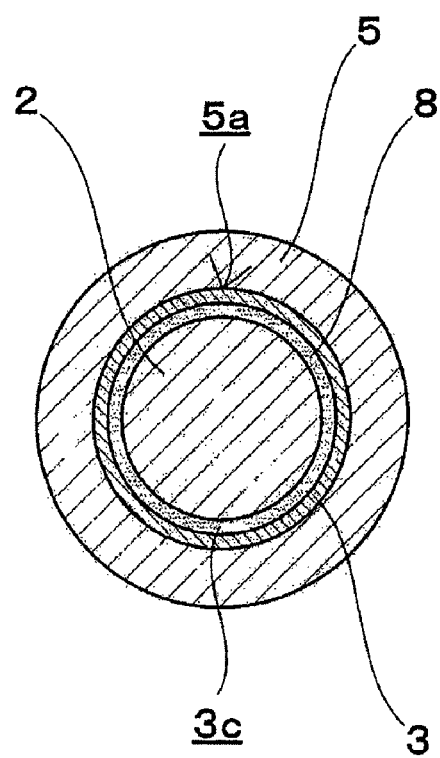
FIG. 2 is a vertical cross-sectional view showing a state taken along a line Y-Y in FIG. 1.

EXPLANATIONS OF LETTERS OR NUMERALS 1 fluid damper
2, 2a, 2b piston
3 cylinder
3a, 3b, 3c cylinder chamber
3c, 3c$_1$, 3c$_2$ orifice
4 piston rod
4' one-sided rod
4a$_1$, 4a$_2$, 4a$_3$ piston rod magnetic portion
4b piston rod non-magnetic portion
5 first yoke
5a hollow portion
6 magnetic field generation device
7 second yoke
8 fluid having magnetic properties
9a first magnetic circuit
9b second magnetic circuit
10, 10' gap surrounded by the magnetic circuit
11 arrow indicating a direction and an intensity of a magnetic field
12 partition wall
13 sealing member
14 accumulator
14a free piston
15 bypass
16 valve
17f, 17f', 17m, 17m' flow of the fluid
20, 20' arrow indicating a direction of a vibration force

BEST MODE(S) FOR CARRYING OUT THE INVENTION

A structure of the present invention will now be explained hereinafter in detail based on the following illustrated best modes.

FIGS. 1 to 5 show a first embodiment of a fluid damper according to the present invention. This fluid damper 1 has a fluid 8 having magnetic properties, a piston 2 formed of a magnetic material, a cylinder 3 in which the fluid 8 having magnetic properties is encapsulated and the piston 2 is accommodated, a piston rod 4 which pierces the cylinder 3 to support the piston 2, a magnetic field generation device 6 provided outside the cylinder 3, a first yoke 5 arranged around the cylinder 3, and a second yoke 7 arranged around the piston rod 4 outside the cylinder 3.

The cylinder 3 has a cylindrical peripheral wall and end face members 3e at both ends in an axial direction, and these members form a hollow portion, i.e., a cylinder chamber. A through hole 3f that the piston rod 4 pierces is provided at a central portion of each end face member 3e. Further, a sealing member 13 that slidably supports the piston rod 4 and avoids leakage of the fluid 8 having magnetic properties filling the cylinder chamber of the cylinder 3 is provided at an edge that partitions this through hole 3f.

It is to be noted that a casing in which a hollow portion has an elliptic or polygonal cross section perpendicular to its axis may be used in place of the cylinder 3 having a cylindrical shape.

Furthermore, the cylinder 3 is formed of a material with a low magnetic permeability through which a magnetic flux hardly passes, e.g., a non-magnetic material such as non-magnetic stainless steel, lead, copper, or aluminum. It is to be noted that the material with a low magnetic permeability through which a magnetic flux hardly passes will be referred to as a non-magnetic material hereinafter.

The piston 2 is formed of a material with a high magnetic permeability through which a magnetic flux readily passes, e.g., a magnetic material such as iron or magnetic ceramics. It is to be noted that the material with a large magnetic permeability through which a magnetic flux readily passes will be referred to as a magnetic material hereinafter.

Moreover, a shape and a size of a cross section of the piston 2 perpendicular to its axis are adjusted so as to form an orifice 3c as a gap between an outer peripheral surface of the piston 2 and an inner peripheral surface of the cylinder 3. In this embodiment, the cross section of the piston 2 perpendicular to its axis is formed into a circular shape in accordance with a shape of a cross section of the cylinder chamber perpendicular to its axis. Additionally, an area of the cross section of the piston 2 perpendicular to its axis is smaller than an area of the cross section of the cylinder chamber perpendicular to its axis so as to form the orifice 3 having an appropriate size to function as the fluid damper between the outer peripheral surface of the piston 2 and the inner peripheral surface of the cylinder 3.

The cylinder chamber of the cylinder 3 is divided into two in the axial direction of the piston 2 by the piston 2 and partitioned into a cylinder chamber 3a and a cylinder chamber 3b. Further, the cylinder chamber 3a is connected with the cylinder chamber 3b through the orifice 3c.

The piston rod 4 has a magnetic portion $4a_1$ which forms a first magnetic circuit 9a together with the piston 2, the first yoke 5, the magnetic field generation device 6, and the second yoke 7 when the piston 2 is displaced to the cylinder chamber 3a side beyond a neutral region, and a magnetic portion $4a_2$ which forms a second magnetic circuit 9b together with the piston 2, the first yoke 5, the magnetic field generation device 6, and the second yoke 7 when the piston 2 is displaced to the cylinder chamber 3b side beyond the neutral region. The piston rod magnetic portion $4a_1$ and the piston rod magnetic portion $4a_2$ are arranged at positions on the piston rod 4 close to the piston 2 and magnetically connected with the piston 2. Furthermore, the piston 2 is magnetically connected with the piston rod magnetic portion $4a_1$ to form the first magnetic circuit 9a, and the piston 2 is magnetically connected with the piston rod magnetic portion $4a_2$ to form the second magnetic circuit 9b.

The piston rod 4 also has non-magnetic portions 4b that cut off the first magnetic circuit 9a and the second magnetic circuit 9b when the piston 2 is in the neutral region on outer sides of the piston rod magnetic portions $4a_1$ and $4a_2$ in the axial direction.

Figure 5A:
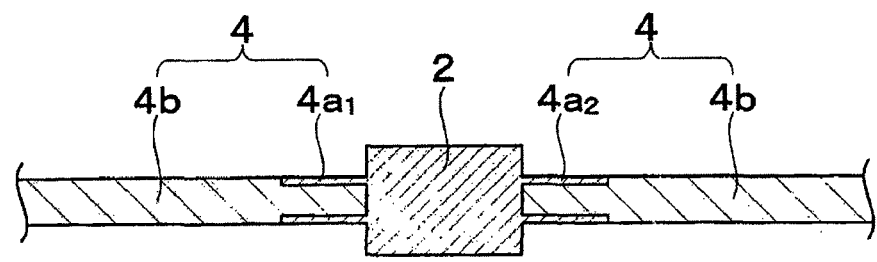
FIG. 5A is a cross-sectional view for explaining a structure of a piston rod when a surface of a piston rod magnetic portion is covered with a magnetic material.
Figure 5B:
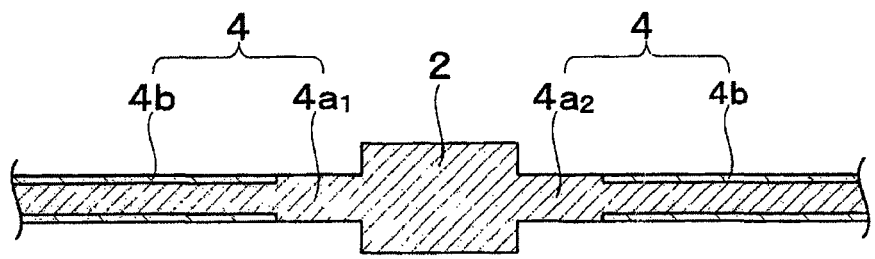
FIG. 5B is a cross-sectional view for explaining the structure of the piston rod when a surface of a piston rod non-magnetic portion is covered with a non-magnetic material.
Figure 5C:
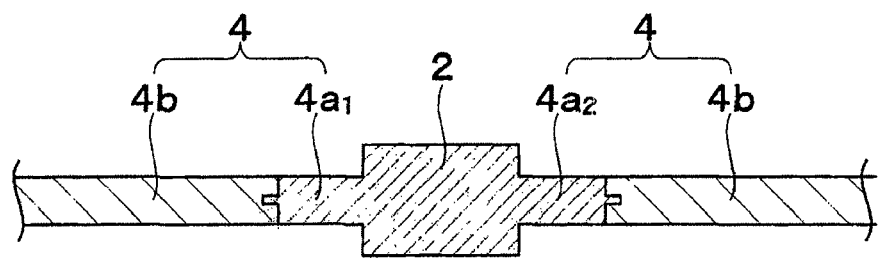
FIG. 5C is a cross-sectional view for explaining the structure of the piston rod when the entire piston rod magnetic portion is formed of a magnetic material and the entire piston rod non-magnetic portion is formed of a non-magnetic material.

It is good enough for the piston rod magnetic portions $4a_1$ and $4a_2$ to be formed of a magnetic material and have regions where a magnetic permeability is high and, for example, a surface of each of these portions may be covered with a magnetic material as shown in FIG. 5A or each of these portions may be entirely formed of a magnetic material as shown in FIG. 5C. Moreover, it is good enough for each piston rod non-magnetic portion 4b to have a region where a magnetic permeability is lower than those of the piston rod magnetic portions $4a_1$ and $4a_2$, and it is preferably formed of a non-magnetic material. For example, as shown in FIG. 5B, a surface of each piston rod non-magnetic portion 4b may be covered with a non-magnetic material having at least a thickness that makes it difficult to form the magnetic circuit, or each piston rod non-magnetic portion 4b may be entirely formed of a non-magnetic material as shown in FIG. 5C. It is to be noted that the piston 2 and the piston rod magnetic portions $4a_1$ and $4a_2$ arranged on both sides thereof are integrally formed.

In case of the piston rod magnetic portions $4a_1$ and $4a_2$ each having the surface covered with a magnetic material, for example, as shown in FIG. 5A, an internal thread is formed on the inner side of each of piston rod magnetic portions $4a_1$ and $4a_2$ and an external thread extending from the end face is formed on each piston rod non-magnetic portion 4b. Additionally, the piston rod magnetic portions $4a_1$ and $4a_2$ on both sides of the piston 2 which are integrally formed with the piston 2 are screwed and coupled with the piston rod non-magnetic portions 4b to form one piston rod 4.

Further, when each of the entire piston rod magnetic portions $4a_1$ and $4a_2$ is formed of a magnetic material and each of the entire piston rod non-magnetic portions 4b is formed of a non-magnetic material, for example, as shown in FIG. 5C, an external thread protruding from the end face is formed on each of the piston rod magnetic portions $4a_1$ and $4a_2$ and an internal thread is formed at the end portion of each piston rod non-magnetic portion 4b. Furthermore, the piston rod magnetic portions $4a_1$ and $4a_2$ on both sides of the piston 2 which are integrally formed with the piston 2 are screwed and coupled with the piston rod non-magnetic portions 4b to form one piston rod 4.

Moreover, in case of the piston rod non-magnetic portion 4b whose surface is covered with a non-magnetic material, for example, as shown in FIG. 5B, a external thread extending from the end face is formed on each of the piston rod magnetic portions $4a_1$ and $4a_2$ and a internal thread is formed on the inner side of each piston rod non-magnetic portion 4b. Additionally, the piston rod magnetic portions $4a_1$ and $4a_2$ on both sides of the piston 2 which are integrally formed with the piston 2 are screwed and coupled with the piston rod non-magnetic portions 4b to form one piston rod 4.

The first yoke 5 is a member that magnetically connects the magnetic field generation device 6 with the piston 2. In this embodiment, the first yoke 5 has a cylindrical peripheral wall and end face members 5b at both ends thereof in the axial direction, and these members form a hollow portion 5a. A through hole 5c that the piston rod 4 is slidably supported to pierce is formed at a central portion of each end face member 5b. It is to be noted that the first yoke 5 is formed of a combination of the cylindrical peripheral wall member and cap members on both sides in the axial direction in this embodiment. As a result, assembling the fluid damper can be facilitated.

The first yoke hollow portion 5a is formed in such a manner that an outer peripheral surface of the cylinder 3 comes into contact with an inner peripheral surface of the first yoke 5, i.e., a peripheral surface of the hollow portion 5a. Furthermore, it is formed so as to have spaces accommodating the magnetic field generation device 6 and the second yoke 7 on both outer sides of the cylinder 3 in the axial direction.

The second yoke 7 is a member that magnetically connects the piston rod magnetic portions $4a_1$ and $4a_2$ with the magnetic field generation device 6. The second yoke 7 is formed into an annular shape having a through hole 7a that the piston rod 4 slidably pierces at a central portion thereof. Moreover, the second yoke 7 is arranged on each of both outer sides of the cylinder 3 in the axial direction.

The magnetic field generation device 6 is a member that generates a magnetic field that is used to form the magnetic circuit 9a or 9b, and it is specifically preferable to use a magnet or a solenoid. In this embodiment, a permanent magnet is used as the magnetic field generation device 6.

The magnetic field generation device 6 is formed into an annular shape having a through hole 6a that the piston rod 4 pierces at a central portion thereof while having a space to obstruct passability of a magnetic flux between the magnetic generation device 6 and the piston rod 4 and to avoid formation of each magnetic circuit in such a manner that the magnetic generation device 6 does not come into contact with the piston rod 4. Additionally, the magnetic field generation device 6 is arranged on each of both outer sides of the cylinder 3 in the axial direction and provided in contact with each second yoke 7 and each end face of the first yoke hollow portion 5a in the axial direction.

Radii of the cross section of the magnetic field generation device 6 and the second yoke 7 perpendicular to the axis are set smaller than a radius of the cross section of the first yoke hollow portion 5a perpendicular to the axis. As a result, a gap 10 is formed between the inner peripheral surface of the first yoke 5 and the outer peripheral surface of the magnetic field generation device 6 and the second yoke 7. Further, the magnetic circuit 9a or 9b passing through the piston 2, the first yoke 5, the magnetic field generation device 6, the second yoke 7, and the piston rod magnetic portion $4a_1$ or $4a_2$ is formed so as to surround the gap 10.

An entire length of the magnetic portion including the piston 2 and the piston rod magnetic portions $4a_1$ and $4a_2$ in the axial direction is set to a length having a positional relationship that the piston rod magnetic portions $4a_1$ and $4a_2$ do not face the second yokes 7 when the piston 2 is in the neutral region and a positional relationship that the piston rod magnetic portions $4a_1$ and $4a_2$ face the second yokes 7 when the piston 2 is displaced beyond the neutral region.

Here, adjusting the entire length of the magnetic portion including the piston 2 and the piston rod magnetic portions $4a_1$ and $4a_2$ in the axial direction with respect to the gaps of the second yokes 7 arranged on both the outer sides of the cylinder 3 in the axial direction enables adjusting a range where the fluid damper 1 demonstrates a damping force close to a damping force based on a fundamental fluid flow resistance of the fluid, i.e., a width of the neutral region. Specifically, a strong damping force is demonstrated even though a displacement amount of the piston 2 is small when the entire length of the magnetic portion in the axial direction with respect to the gaps of the second yokes 7 is increased, and a strong damping force is demonstrated only if a displacement amount of the piston 2 is large when the entire length of the magnetic portion in the axial direction is reduced.

The cylinder chambers 3a and 3b and the orifice 3c formed in the cylinder 3 in a state where piston 2 and the piston rod 4 are accommodated are filled with the fluid 8 having the magnetic properties. As the fluid 8 having the magnetic properties, specifically, a magneto-rheological fluid is used, for example. Since the magneto-rheological fluid contains ferromagnetic particles of a micro-scale and seemingly demonstrates a behavior as if the fluid has the magnetic properties, an apparent viscosity varies in response to an intensity of a magnetic field. That is, the fluid flow resistance of the magneto-rheological fluid is further increased when a magnetic field is applied, and the fluid flow resistance is restored when the magnetic field is removed. It is to be noted that, since a change in a shear stress is generally smaller when a particle diameter of the ferromagnetic material dispersed in the fluid is large, a change in a damping force due to application of a magnetic field is relatively small. Therefore, adjusting the particle diameter of the ferromagnetic material dispersed in the magneto-rheological fluid depending on, e.g., an installation position or an intended purpose of the fluid damper enables providing the appropriate fluid damper in accordance with a required damping force. It is to be noted that the magneto-rheological fluid is used as the magnetic fluid 8 having magnetic properties in this embodiment.

An operation of the fluid damper 1 according to this embodiment will now be explained hereinafter.

Figure 3A:
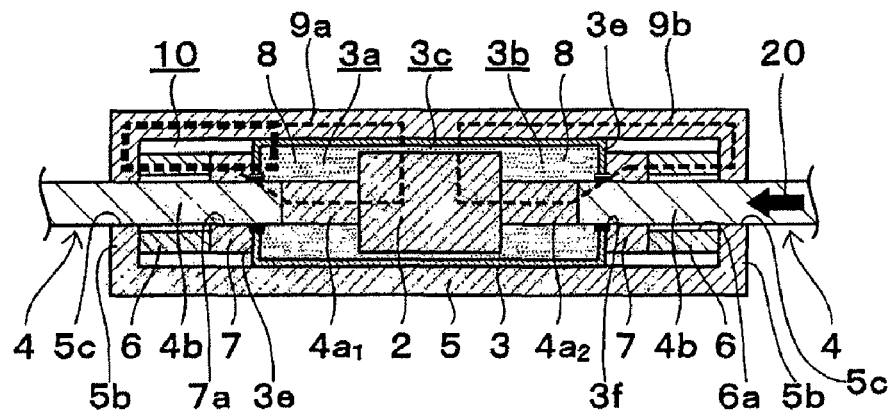
FIG. 3A is a cross-sectional view for explaining an operation of the fluid damper according to the first embodiment and showing a state where a piston is not displaced.
Figure 4A:
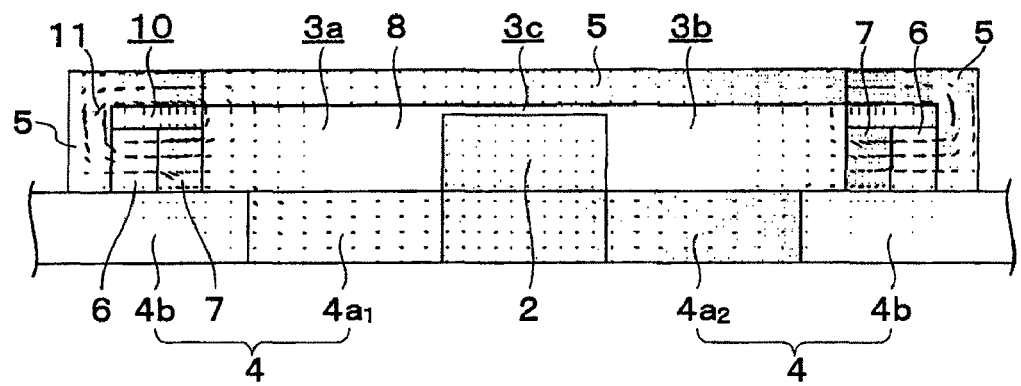
FIG. 4A is a cross-sectional view showing a magnetic field distribution of the fluid damper according to the first embodiment when the piston is not displaced.

As shown in FIG. 3A, when the piston 2 is at a neutral position, each piston rod non-magnetic portion 4b is interposed between each second yoke 7 and the piston rod magnetic portion $4a_1$ or $4a_2$ to serve a gap in the magnetic circuit. Therefore, the magnetic circuit 9a or 9b passing through the magnetic field generation device 6, the second yoke 7, the piston rod magnetic portion $4a_1$ or $4a_2$, the piston 2, and the first yoke 5 is not formed or hardly has a magnetic flux density passing therethrough. Therefore, as shown in FIG. 4A, since a magnetic field is hardly applied to the magneto-rheological fluid 8 in the orifice 3c portion, the fluid flow resistance hardly varies. Further, at this time, the magnetic circuit which does not pass through the piston rod 4 or the piston 2, i.e., the magnetic circuit passing through the magnetic field generation device 6, the first yoke 5, and each second yoke 7 is formed. In this state, the fluid damper 1 operates as a fluid damper having a damping force close to a damping force based on the fundamental fluid flow resistance of the magneto-rheological fluid 8. It is to be noted that a direction of an arrow 11 in FIG. 4 represents a direction of the magnetic field at a starting position of the arrow and a length of the arrow 11 represents an intensity of the magnetic field.

When a vibration force having a direction indicated by an arrow 20 is applied to the piston rod 4 in this state, the piston rod 4 and the piston 2 move in the direction of the arrow 20. At this time, the magneto-rheological fluid 8 flows to the cylinder chamber 3b from the cylinder chamber 3a through the orifice 3c in accordance with movement of the piston 2. At this time, since the magnetic field is hardly applied to the magneto-rheological fluid 8 in the orifice 3c portion and the fluid flow resistance also hardly varies when the piston 2 is placed at the neutral position, the fluid damper 1 demonstrates a damping effect as a fluid damper having a damping force close to a damping force based on the fundamental fluid flow resistance of the magneto-rheological fluid 8 on an initial stage of movement of the piston 2.

Figure 3B:
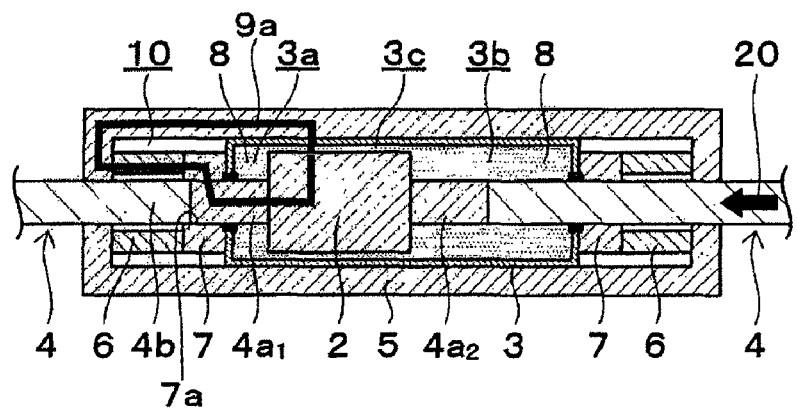
FIG. 3B is a cross-sectional view for explaining the operation of the fluid damper according to the first embodiment and showing a state where the piston is displaced in one side beyond a neutral region.
Figure 4B:
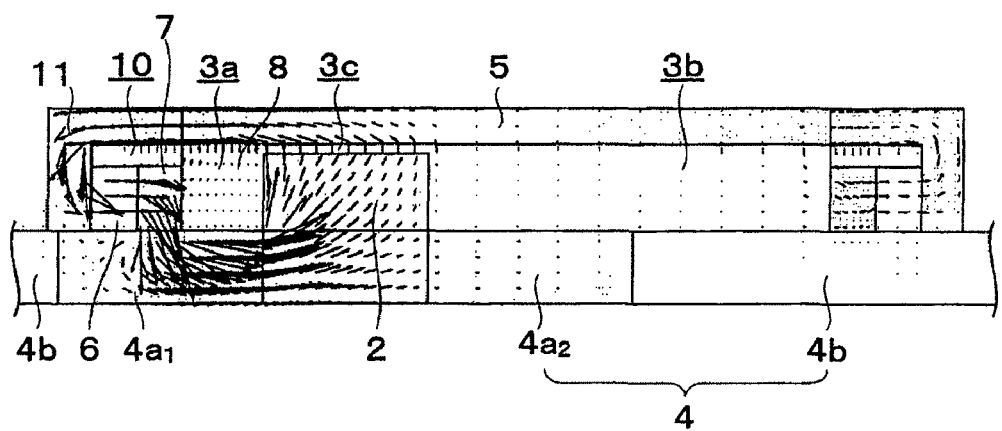
FIG. 4B is a cross-sectional view showing a magnetic field distribution of the fluid damper according to the first embodiment when the piston is displaced beyond the neutral region.

Furthermore, when the piston rod 4 and the piston 2 are further displaced in the direction of the arrow 20, i.e., toward the cylinder chamber 3a side, the piston rod magnetic portion $4a_1$ protrudes from the cylinder 3 to enter the through hole 7a at the central portion of the second yoke 7 as shown in FIG. 3B so that a magnetic flux can readily pass through between the second yoke 7 and the piston rod magnetic portion $4a_1$. Therefore, a magnetic flux density of the magnetic circuit 9a is increased. As a result, as shown in FIG. 4B, an intensive magnetic field is applied to the magneto-rheological fluid 8 in the orifice 3c portion, the fluid flow resistance is further increased, the damping force of the fluid damper 1 is raised, and the fluid damper 1 demonstrates the strong damping effect.

Figure 3C:
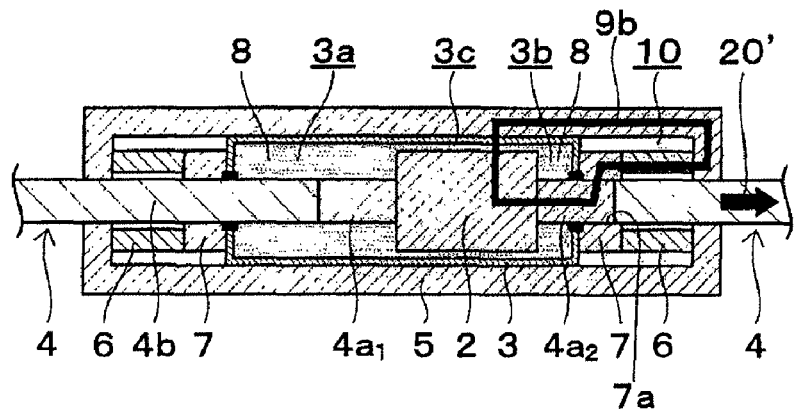
FIG. 3C is a cross-sectional view for explaining an operation of the fluid damper according to the first embodiment and showing a state where the piston is displaced in the other side beyond the neutral region.

Moreover, when the piston rod 4 and the piston 2 are greatly displaced in a direction of an arrow 20', i.e., toward the cylinder chamber 3b side, the piston rod magnetic portion $4a_2$ protrudes from the cylinder 3 to enter the through hole 7a at the central portion of the second yoke 7 as shown in FIG. 3C so that a magnetic flux can readily pass through between the second yoke 7 and the piston rod magnetic portion $4a_2$. Therefore, a magnetic flux density of the magnetic circuit 9b is increased. As a result, an intensive magnetic field is applied to the magneto-rheological fluid 8 in the orifice 3c portion, the fluid flow resistance is further increased, the damping force of the fluid damper 1 is raised, and the fluid damper 1 demonstrates the strong damping effect.

In this manner, when a displace amount of the piston 2 is small in vibrations with a small amplitude, the fluid damper 1 according to the present invention demonstrates the damping force close to the damping force based on the fundamental fluid flow resistance of the magneto-rheological fluid 8 and operates as a fluid damper that efficiently reduces an acceleration response. Additionally, when the amplitude of the vibrations is increased, the displacement amount of the piston 2 is gradually increased, the piston rod magnetic portion $4a_1$ or $4a_2$ moves closer to the second yoke 7, the magnetic field applied to the magneto-rheological fluid 8 in the orifice 3c portion is thereby gradually intensified, and the fluid damper 1 serves as a fluid damper whose damping force is gradually raised with an increase in the fluid flow resistance. Further, when the displacement amount of the piston 2 is large in vibrations with a large amplitude, the piston rod magnetic portion $4a_1$ or $4a_2$ further enters the second yoke 7, the intensive magnetic field is applied to the magneto-rheological fluid 8 in the orifice 3c portion, the fluid flow resistance is increased, and the fluid damper 1 serves as a fluid damper that demonstrates the strong damping force to suppress large deformation. As a result, even if a large vibration force is applied to the piston rod 4, the fluid damper 1 according to the present invention does not suddenly demonstrate the strong damping force to perform control with a large impact, but it gradually increases the damping force to demonstrate the smooth damping effect, and it demonstrates the powerful damping force to demonstrate the strong damping effect when the vibration force applied to the piston rod 4 is large and the displacement amount of the piston 2 is large.

It is to be noted that, since the magneto-rheological fluid 8 is encapsulated by the cylinder 3 in this embodiment, the first yoke 5 does not have to encapsulate the magneto-rheological fluid 8. Therefore, the first yoke 5 may have any shape as long as it forms a part of the magnetic circuit 9a or 9b between the piston 2 and the magnetic field generation device 6. Specifically, for example, linear yokes may be attached to a peripheral portion of the cylinder 3 in the axial direction. In this case, a degree of formation of each magnetic circuit can be modified to adjust the damping force of the fluid damper by changing, e.g., arrangement intervals, the number, or a cross-sectional size of the yokes.

Further, in this embodiment, although the piston rod 4 is constituted of the magnetic portions $4a_1$ and $4a_2$ having a high magnetic permeability and the non-magnetic portion 4b having a low magnetic permeability alone, a portion having an intermediate magnetic permeability between the magnetic permeability of the piston rod magnetic portions $4a_1$ and $4a_2$ and that of the non-magnetic portion 4b may be provided between the magnetic portions $4a_1$ or $4a_2$ and the non-magnetic portion 4b. Furthermore, the magnetic permeability of the piston rod 4 may be gradually reduced from a position close to the piston 2 to a position far from the same. In this case, adjusting a change in the magnetic permeability of the piston rod 4 enables gradually or gently varying the damping force of the fluid damper 1.

Moreover, in this embodiment, although the magneto-rheological fluid 8 is used as the fluid having the magnetic properties, a magnetic fluid can be also used. Additionally, a fluid in which the magneto-rheological fluid and the magnetic fluid are mixed can be also used. Since apparent viscosities of both the magneto-rheological fluid and the magnetic fluid vary in response to an intensity of the magnetic field, the damping force of the fluid damper 1 can be autonomously changed in accordance with movement of the piston 2. It is to be noted that the magneto-rheological fluid is used as the fluid having the magnetic properties in the following embodiments, but the magnetic fluid can be used or the fluid in which the magneto-rheological fluid and the magnetic fluid are mixed can be used as the fluid having the magnetic properties.

Further, although the permanent magnet is used as each magnetic field generation device 6 in this embodiment, a solenoid which is specifically a direct-current coil or an alternating-current coil can be used in place of the permanent magnet. In this case, although a problem that a power supply is required is present, there is an advantage that the fluid damper 1 can be reduced in size as compared with the example using the permanent magnet or the intensive magnetic field can be generated to demonstrate the further strong damping force.

Figure 6:
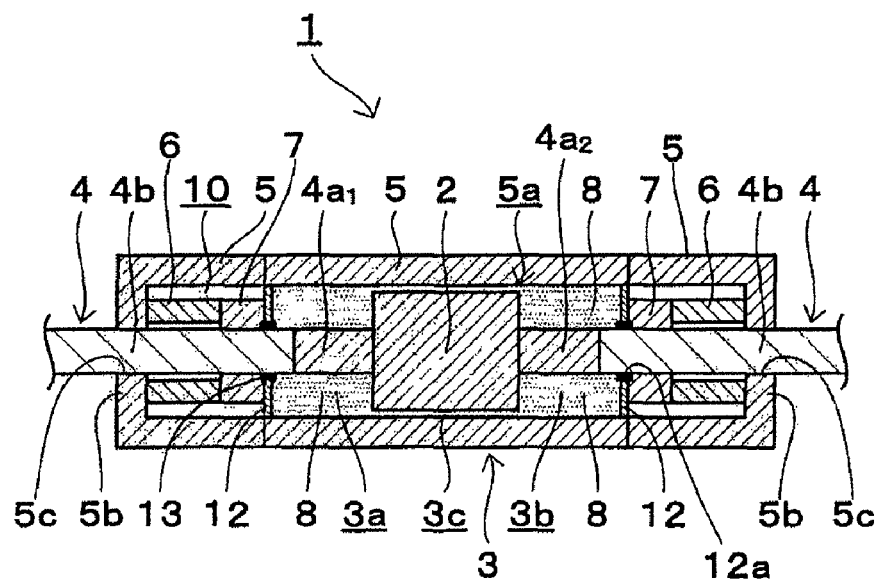
FIG. 6 is a cross-sectional view showing a second embodiment of the fluid damper according to the present invention.

Furthermore, FIG. 6 shows a second embodiment of the fluid damper according to the present invention. In a fluid damper 1 according to this embodiment, a cylinder 3 and a first yoke 5 are formed of the same member. Specifically, the cylinder 3 is formed of the first yoke 5 and two partition walls 12 in a hollow portion 5a, the first yoke 5 being constituted of a cylindrical peripheral wall and end face members 5b at both ends in the axial direction and the a hollow portion 5a being formed of these members.

When the constituent members of the cylinder 3 and the first yoke 5 are formed of the same member like this embodiment, the cylinder 3 itself plays a role of being a part of a magnetic circuit as the first yoke 5, and the first yoke 5 fulfills a role of encapsulating a magneto-rheological fluid 8 as a part of the cylinder 3.

Each partition wall 12 is formed of a non-magnetic material. Moreover, a through hole 12a that a piston rod 4 pierces is provided at a central portion of the partition wall 12. Additionally, a sealing member 13 that slidably supports the piston rod 4 and avoids leakage of the magneto-rheological fluid 8 in a cylinder chamber of the cylinder 3, i.e., a space sandwiched between both the partition walls 12 of the first yoke hollow portion 5a in this embodiment is provided at an edge that partitions this through hole 12a.

Figure 7:
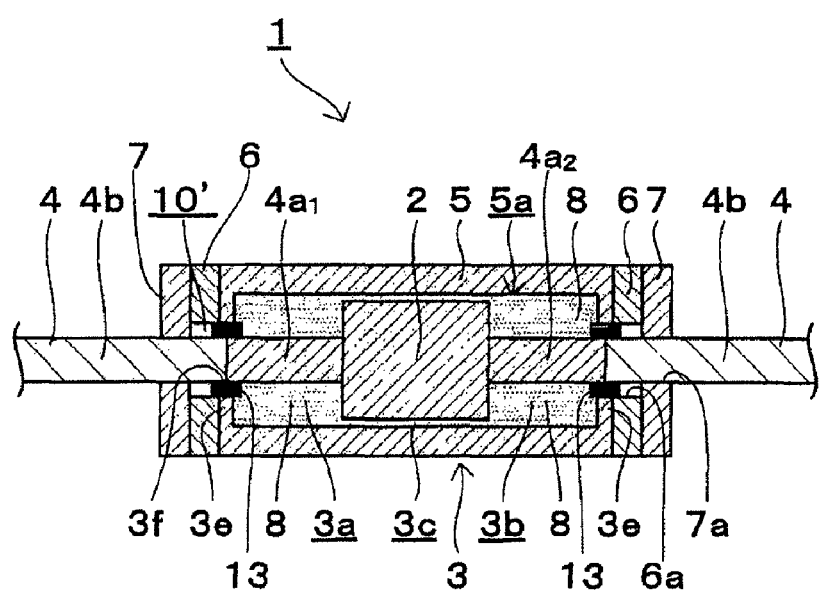
FIG. 7 is a cross-sectional view showing a third embodiment of the fluid damper according to the present invention.

Further, FIG. 7 shows a third embodiment of the fluid damper according to the present invention. In this embodiment, likewise, a cylinder 3 and a first yoke 5 are constituted of the same member. In this embodiment, a sealing member 13 provided at an edge which partitions a through hole 3f that a piston rod 4 pierces at a central portion of each end face member 3e of the cylinder 3 is formed of a non-magnetic material to avoid formation of a magnetic circuit that does not pass through a piston 2.

In this embodiment, each magnetic field generation device 6 is arranged on each of both outer sides of the cylinder 3 in the axial direction and provided in contact with each end face of the cylinder 3 in the axial direction. Furthermore, a second yoke 7 is provided in contact with an end face of each magnetic field generation device 6 on the opposite side of the cylinder 3 in the axial direction.

Moreover, a magnetic circuit is formed so as to surround a space formed of each gap 10' between an inner peripheral surface of a through hole 6a at a central portion of each magnetic field generation device 6 and an outer peripheral surface of the piston rod 4, the sealing member 13, and a cylinder chamber 3a or 3b.

Figure 8A:
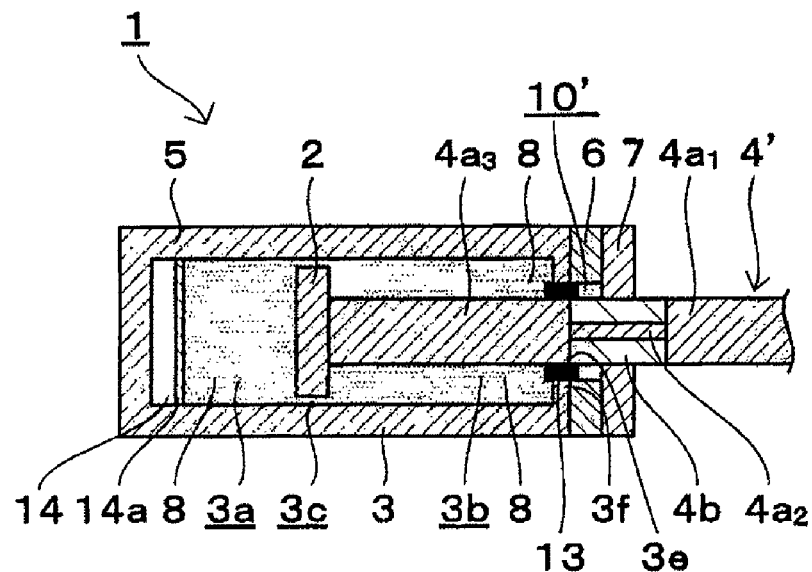
FIG. 8A is a cross-sectional view showing a fourth embodiment of the fluid damper according to the present invention in a state where a piston is not displaced.

Additionally, FIG. 8 shows a fourth embodiment of the fluid damper according to the present invention. This embodiment is applied to a cantilever support damper, and a one-sided rod 4' that pierces an end face member 3e on one side of a cylinder 3 in the axial direction to support a piston 2 from one side is used as a piston rod. It is to be noted that an end portion of the cylinder 3 on the opposite side in the axial direction with respect to the end face member 3e that the one-sided rod 4' pierces is closed. Further, in this fluid damper 1 using the one-sided rod 4', an accumulator 14 partitioned by a free piston 14a is provided in a cylinder chamber of the cylinder 3 in order to cope with a change in a volume of the one-sided rod 4' entering the cylinder 3.

Figure 8B:
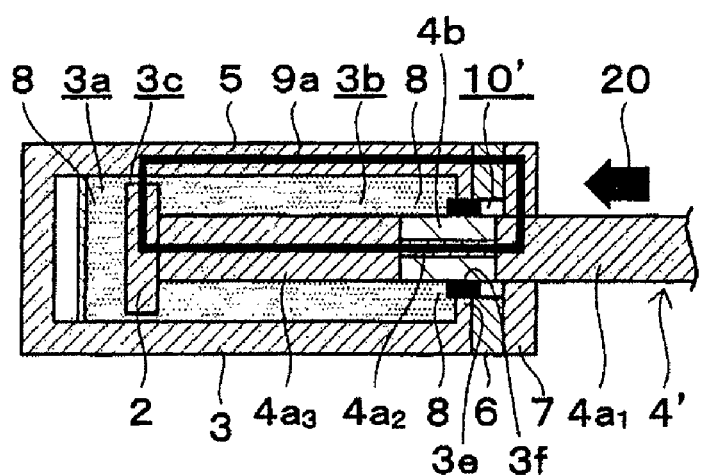
FIG. 8B is a cross-sectional view showing the fourth embodiment of the fluid damper according to the present invention in a state where the piston is displaced in one side beyond a neutral region.
Figure 8C:
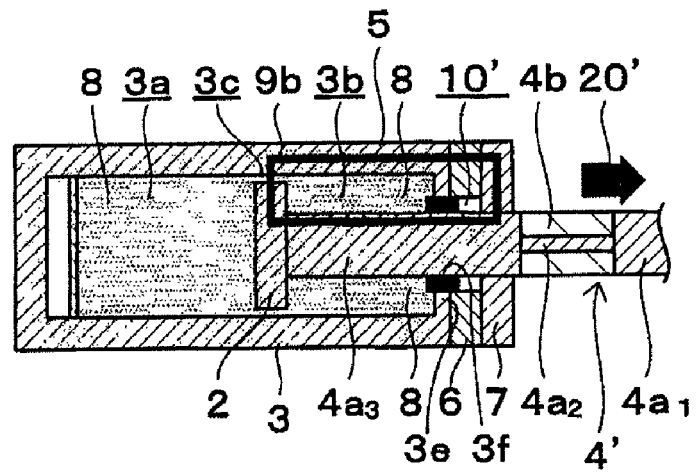
FIG. 8C is a cross-sectional view showing the fourth embodiment of the fluid damper according to the present invention in a state where the piston is displaced in the other side beyond the neutral region.

Furthermore, in this embodiment, as shown in FIG. 8B, the one-sided rod 4' has piston rod magnetic portions $4a_1$, $4a_2$, and $4a_3$ that form a first magnetic circuit 9a together with the piston 2, a first yoke 5, a magnetic field generation device 6, and a second yoke 7 when the piston 2 is displaced in a direction of an arrow 20, i.e., toward a cylinder chamber 3a side beyond a neutral region. Moreover, as shown in FIG. 8C, when the piston 2 is displaced in a direction of an arrow 20', i.e., toward a cylinder chamber 3b side beyond the neutral region, the piston 2, the first yoke 5, the magnetic generation device 6, the second yoke 7, and the piston rod magnetic portion 4a₃ form a second magnetic circuit 9b.

Additionally, the one-sided rod 4' has a piston rod non-magnetic portion 4b between the piston rod magnetic portion 4a₁ and the piston rod magnetic portion 4a₃ so as to function as a gap that cuts off a magnetic circuit passing through an orifice 3c between the piston 2 and the cylinder 3 when the piston 2 is in the neutral region.

Further, an arrangement of the piston rod magnetic portions 4a₁ and 4a₃ and the piston rod non-magnetic portion 4b is set to a relationship that the piston rod non-magnetic portion 4b faces the second yoke 7 to make it hard to pass a magnetic flux when the piston 2 is in the neutral region and that one of the piston rod magnetic portions 4a₁ and 4a₃ faces the second yoke 7 to make it easy to pass a magnetic flux when the piston 2 is displaced beyond the neutral region.

Although this is a one-sided rod damper, since providing the one-sided rod 4' having the above-explained structure enables forming the magnetic circuit 9a or 9b in the fluid damper and changing a magnetic flux density of this magnetic circuit 9a or 9b when the piston 2 moves to one of both sides in the axial direction from a neutral position to be apart from the neutral region, an intensity of a magnetic field applied to the magneto-rheological fluid 8 in an orifice 3c portion can be changed in accordance with a magnitude of a displacement amount of the piston 2, and a damping force of the fluid damper 1 can be changed by varying a fluid flow resistance.

It is to be noted that the cylinder 3 and the first yoke 5 are likewise constituted of the same member in this embodiment, they may be constituted of different members like the embodiment depicted in FIG. 1.

Furthermore, FIGS. 9 to 12 show a fifth embodiment of the fluid damper according to the present invention. A fluid damper 1 according to this embodiment adopts as a piston a pair of first and second pistons 2a and 2b formed of a magnetic material arranged to face each other with a gap therebetween in the axial direction through a non-magnetic material 4c, and providing bypasses 15 to the pair of pistons to allow a magneto-rheological fluid to pass in opposed directions alone enables switching spaces through which the magneto-rheological fluid passes in accordance with an oscillating direction of the pistons. The non-magnetic material 4c will be referred to as a piston rod non-magnetic portion 4c and the first and second pistons 2a and 2b formed of a magnetic material will be referred to as pistons 2a and 2b hereinafter.

It is to be noted that like reference numerals denote structures equal to those in the foregoing embodiments, thereby omitting an explanation thereof. Further, in the fluid damper 1 according to this embodiment, a cylinder 3 also has a function as a first yoke 5 and the cylinder 3 and the first yoke 5 are constituted of the same member, but the present invention is not restricted to this cylinder structure in particular, and such a cylinder structure as depicted in FIG. 1 can be also adopted, for example.

A cylinder chamber of the cylinder 3 is partitioned into a first cylinder chamber 3a, a second cylinder chamber 3b, and a third cylinder chamber 3d sandwiched between the pistons 2a and 2b by the pistons 2a and 2b. Furthermore, the first cylinder chamber 3a and the third cylinder chamber 3d are connected with each other through an orifice 3c₁ as a gap between an outer peripheral surface of the piston 2a and an inner peripheral surface of the cylinder 3, and the second cylinder chamber 3b and the third cylinder chamber 3d are connected with each other through an orifice 3c₂ as a gap between an outer peripheral surface of the piston 2b and the inner peripheral surface of the cylinder 3.

Moreover, the piston 2a on the first cylinder chamber 3a side includes the bypass 15 that allows the first cylinder chamber 3a to communicate with the third cylinder chamber 3d and allows the magneto-rheological fluid 8 to pass therethrough. Additionally, the piston 2a includes a check valve 16 provided to the bypass 15, the check valve 16 allowing the magneto-rheological fluid 8 to pass in a direction from the first cylinder chamber 3a to the third cylinder chamber 3d alone.

Further, the piston 2b on the second cylinder chamber 3b side includes the bypass 15 that allows the second cylinder chamber 3b to communicate with the third cylinder chamber 3d and allows the magneto-rheological fluid 8 to pass therethrough. Furthermore, the piston 2b includes the check valve 16 provided to the bypass 15, the check valve 16 allowing the magneto-rheological fluid 8 to pass in a direction from the second cylinder chamber 3b to the third cylinder chamber 3d alone.

The check valve 16 may have any structure as long as it limits a fluid passage direction in the bypass 15 to one direction. For example, it can be considered to use a flexible tabular member that is larger than an opening portion of the bypass 15, closes the opening portion of the bypass 15 when it is not bent, and is partially fixed to a periphery of the bypass 15. Specifically, using a reed valve can be considered. In this case, the valve is opened to discharge the fluid when the fluid is to flow out from the bypass 15, but the valve is closed to prevent the fluid from flowing in regard to a flowage in a direction along which the fluid flows into the bypass 15.

Providing one bypass 15 to each of the pistons 2a and 2b can suffice. Moreover, a cross-sectional shape of the bypass 15 is not restricted to a specific shape, and a circular shape or a polygonal shape can be adopted. Additionally, the bypass 15 may be provided as a through hole or formed as a concave portion provided on the outer peripheral surface of the piston 2a or 2b.

A piston rod 4 has a piston rod magnetic portion 4a₁ that forms a first magnetic circuit 9a together with the first piston 2a, the cylinder 3, a magnetic field generation device 6, and a second yoke 7 when the piston 2a is displaced toward the first cylinder chamber 3a side beyond a neutral region, and a piston rod magnetic portion 4a₂ that forms a second magnetic circuit 9b together with the second piston 2b, the cylinder 3, the magnetic generation device 6, and the second yoke 7 when the piston 2b is displaced toward the second cylinder chamber 3b side beyond the neutral region. The piston rod magnetic portion 4a₁ and the piston rod magnetic portion 4a₂ are arranged at positions on the piston rod 4 close to the pistons 2a and 2b and magnetically connected with the corresponding pistons 2a and 2b, respectively. Further, the piston 2a is magnetically connected with the piston rod magnetic portion 4a₁ to form the first magnetic circuit 9a, and the piston 2b is magnetically connected with the piston rod magnetic portion 4a₂ to form the second magnetic circuit 9b.

The piston rod 4 also has piston rod non-magnetic portions 4b that cut off the first magnetic circuit 9a when the piston 2a is in the neutral region and cuts off the second magnetic circuit 9b when the piston 2b is in the neutral region on the outer sides of the piston rod magnetic portions 4a₁ and 4a₂ in the axial direction, respectively.

Figure 11A:
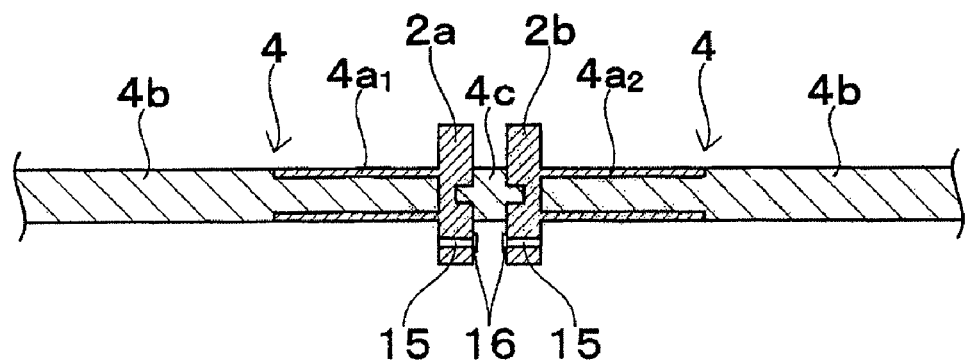
FIG. 11A is a cross-sectional view for explaining a structure of a piston rod when a surface of each piston rod magnetic portion is covered with a magnetic material.
Figure 11B:
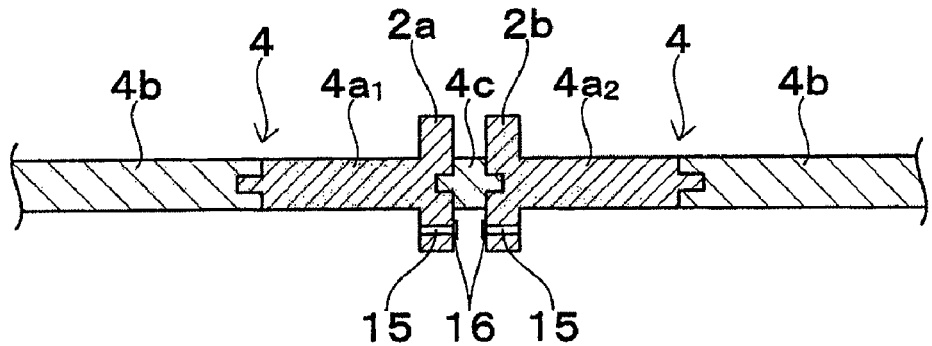
FIG. 11B is a cross-sectional view for explaining a structure of the piston rod when the entire piston rod magnetic portions are formed of a magnetic material and entire piston rod non-magnetic portions are formed of a non-magnetic material.
Figure 11C:
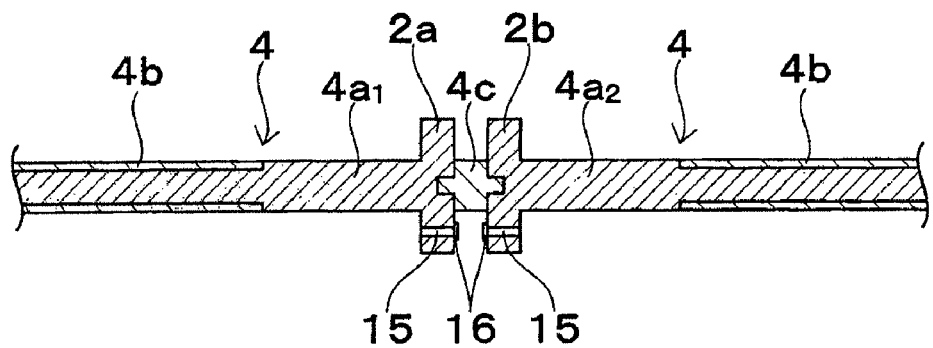
FIG. 11C is a cross-sectional view for explaining the structure of the piston rod when a surface of each piston rod non-magnetic portion is covered with a non-magnetic material.

It is good enough for the piston rod magnetic portions 4a₁ and 4a₂ to be formed of a magnetic material and to have regions with a high magnetic permeability and, like the explanation in the first embodiment, for example, each of the piston rod magnetic portion 4a₁ and 4a₂ may be entirely formed of a magnetic material as shown in FIG. 11B, or a surface of each of these portions may be covered with a magnetic material as shown in FIG. 11A. Furthermore, it is good enough for the piston rod non-magnetic portions $4b$ and $4c$ to have regions with a lower magnetic permeability than that of the piston rod magnetic portions $4a_1$ and $4a_2$, and these portions are preferably formed of a non-magnetic material. For example, each of these portions may be entirely formed of a non-magnetic material as shown in FIG. 11B, or a surface of each of these portions may be covered with a non-magnetic material having a thickness that makes it hard to form at least a magnetic circuit as shown in FIG. 11C. It is to be noted that the piston $2a$ and the piston rod magnetic portion $4a_1$ are integrally formed and the piston $2b$ and the piston rod magnetic portion $4a_2$ are integrally formed.

It is to be noted that, when the piston rod non-magnetic portion $4c$ is provided, for example, internal threads are formed at an end portion of the piston $2a$ integrally formed with the piston rod magnetic portion $4a_1$ and an end portion of the piston $2b$ integrally formed with the piston rod magnetic portion $4a_2$, and external threads protruding from both side end faces of the piston rod non-magnetic portion $4c$ in the axial direction are formed. Furthermore, the piston $2a$ integrally formed with the piston rod magnetic portion $4a_1$ and the piston $2b$ integrally formed with the piston rod magnetic portion $4a_2$ are screwed and coupled on both sides of the piston rod non-magnetic portion $4c$ in the axial direction, and the piston rod non-magnetic portions $4b$ are further screwed and coupled on both sides, thereby forming one piston rod $4$.

In this embodiment, the magnetic generation devices $6$ are arranged on both outer sides of the cylinder $3$ in the axial direction and provided in contact with end faces of the cylinder $3$ in the axial direction.

Each second yoke $7$ is formed into an annular shape having a through hole $7a$ at a central portion thereof, the through hole $7a$ slidably supporting the piston rod $4$. Moreover, the second yokes $7$ are arranged on both the outer sides of the cylinder $3$ in the axial direction and provided in contact with end faces of the magnetic generation devices $6$ on the opposite side of the cylinder $3$ in the axial direction.

As a result, a gap $10'$ is formed between an inner peripheral surface of the through hole $6a$ of each magnetic generation device $6$ and an outer peripheral surface of the piston rod $4$. Additionally, first and second magnetic circuits $9a$ and $9b$ passing through the magnetic generation devices $6$, the second yokes $7$, the piston rod magnetic portions $4a_1$ and $4a_2$, the pistons $2a$ and $2b$, and the cylinder $3$ are formed so as to surround spaces formed of the gaps $10'$, the sealing members $13$, and the first and second cylinder chambers $3a$ and $3b$, respectively.

An operation of the fluid damper $1$ according to the fifth embodiment will now be explained hereinafter.

Figure 9:
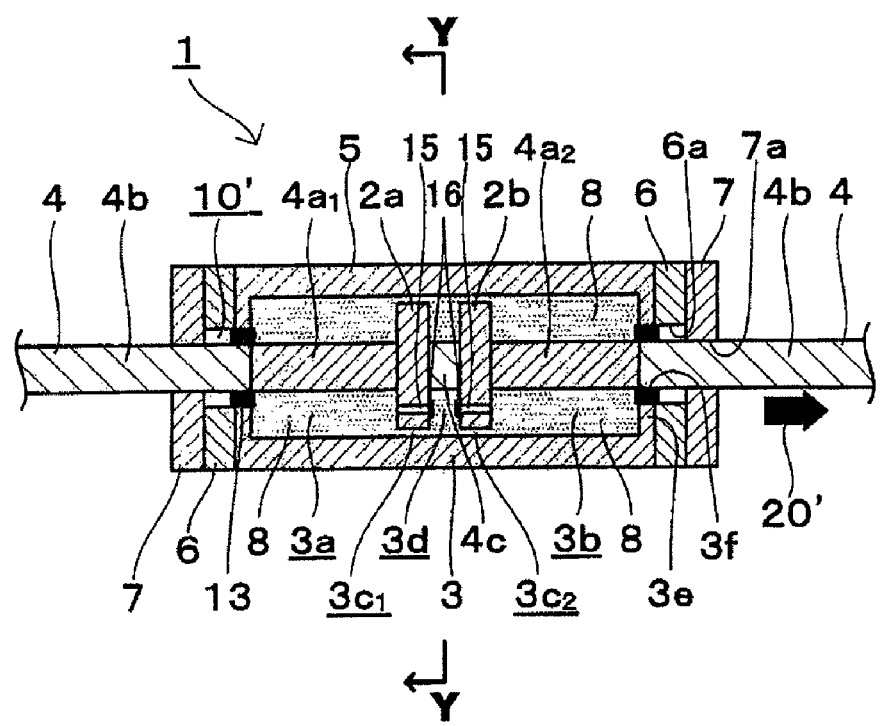
FIG. 9 is a cross-sectional view showing a fifth embodiment of the fluid damper according to the present invention.
Figure 10:
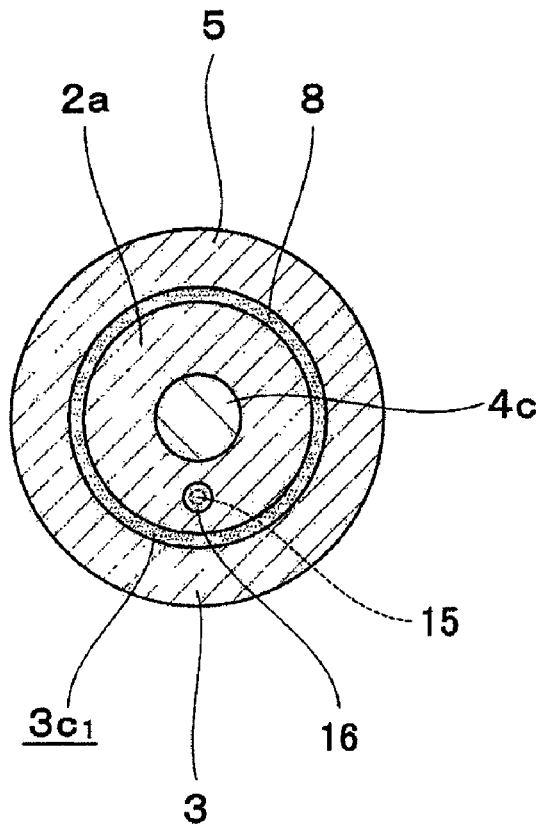
FIG. 10 is a vertical cross-sectional view showing a state taken along a line Y-Y in FIG. 9.

As shown in FIG. 9, when the pistons $2a$ and $2b$ are placed at a neutral position, the piston rod non-magnetic portions $4b$ are respectively interposed between the second yokes $7$ and the piston rod magnetic portions $4a_1$ and $4a_2$ to serve as gaps on the magnetic circuits. Therefore, the magnetic circuits passing through the magnetic field generation devices $6$, the second yokes $7$, the piston rod magnetic portions $4a_1$ and $4a_2$, the pistons $2a$ and $2b$, and the cylinder $3$ are not formed or hardly have a magnetic flux density passing therethrough. Therefore, since a magnetic field is hardly applied to the magneto-rheological fluid $8$ in the portions of the orifices $3c_1$ and $3c_2$, a fluid flow resistance also hardly varies.

In this state, when a vibration force in a direction of an arrow $20'$ is applied to the piston rod $4$, the piston rod $4$ and the pistons $2a$ and $2b$ move in the direction of the arrow $20'$.

At this time, by the function of the check valves $16$ provided to the bypasses $15$ of the pistons $2a$ and $2b$, the magneto-rheological fluid $8$ can flow from the second cylinder chamber $3b$ to the third cylinder chamber $3d$ via the bypass $15$ of the piston $2b$ but cannot flow from the third cylinder chamber $3d$ to the first cylinder chamber $3a$ via the bypass $15$ of the piston $2a$.

Therefore, the magneto-rheological fluid $8$ flows from the second cylinder chamber $3b$ to the third cylinder chamber $3d$ through the bypass $15$ of the piston $2b$ and the orifice $3c_2$ and further flows from the third cylinder chamber $3d$ to the first cylinder chamber $3a$ through the orifice $3c_1$ in accordance with movement of the pistons $2a$ and $2b$.

At this time, since a magnetic field is hardly applied to the magneto-rheological fluid $8$ in the portions of the orifices $3c_1$ and $3c_2$ and the fluid flow resistance also hardly varies when the pistons $2a$ and $2b$ are placed at the neutral position, the fluid damper $1$ demonstrates a damping effect as a fluid damper having a damping force close to a damping force based on the fundamental fluid flow resistance of the magneto-rheological fluid $8$ on an initial stage of movement of the pistons $2a$ and $2b$.

Figure 12A:
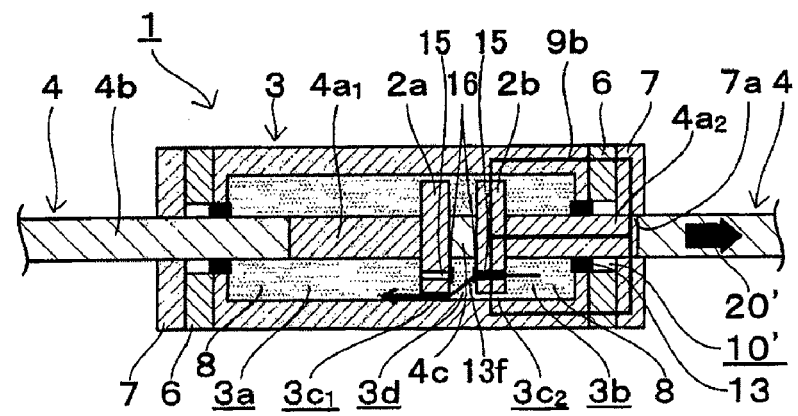
FIG. 12A is a cross-sectional view for explaining an operation of the fluid damper according to the fifth embodiment when pistons are moving toward a second cylinder chamber side.

Additionally, when the piston rod $4$ and the pistons $2a$ and $2b$ are further displaced in the direction of the arrow $20'$, i.e., toward the second cylinder chamber $3b$ side, as shown in FIG. 12A, the piston rod magnetic portion $4a_2$ protrudes from the cylinder $3$ to enter the through hole $7a$ at the central portion of the second yoke $7$, thereby facilitating passage of a magnetic flux between the second yoke $7$ and the piston rod magnetic portion $4a_2$. Therefore, a magnetic flux density of the magnetic circuit $9b$ passing through the magnetic generation device $6$, the second yoke $7$, the piston rod magnetic portion $4a_2$, the piston $2b$, and the cylinder $3$ is increased. As a result, an intensive magnetic field is applied to the magneto-rheological fluid $8$ in the orifice $3c_2$ portion, thereby further increasing the fluid flow resistance.

On the other hand, in the vicinity of the bypass $15$ of the piston $2b$, a magnetic flux evades the bypass $15$ and passes through the piston $2b$ portion having a high magnetic permeability. Therefore, a magnetic field is hardly applied to the magneto-rheological fluid $8$ passing through the bypass $15$, and the fluid flow resistance also hardly varies.

Further, although a magnetic flux density of the magnetic circuit $9b$ connecting the members with high magnetic permeability in a minimum distance is increased, the piston rod non-magnetic portions $4b$ and $4c$ serve as gaps between the piston $2a$ and the magnetic field generation device $6$, and the magnetic circuit passing through the piston $2a$ is not formed or hardly has a magnetic flux density passing therethrough. Therefore, a magnetic field is hardly applied to the magneto-rheological fluid $8$ in the orifice $3c_1$ portion, and the fluid flow resistance also hardly varies.

Furthermore, since the fluid flow resistance in the orifice $3c_2$ portion is increased due to rise of the magnetic flux density of the magnetic circuit $9b$, the magneto-rheological fluid $8$ flows into the third cylinder chamber $3d$ via the bypass $15$ of the piston $2b$ through which the magnetic flux does not pass as indicated as a flow $17f$ of the fluid in FIG. 12A. Moreover, the magneto-rheological fluid $8$ flows into the first cylinder chamber $3a$ from the third cylinder chamber $3d$ via the orifice $3c_1$ to which the magnetic field is hardly applied.

When the pistons $2a$ and $2b$ move from the neutral position in the direction of the arrow $20'$, i.e., toward the second cylinder chamber $3b$ side in this manner, the magneto-rheological fluid $8$ flows along the flow $17f$ of the fluid passing via the bypass $15$ of the piston $2b$ through which the magnetic flux does not pass and the orifice $3c_1$. Additionally, since the fluid flow resistance of the magneto-rheological fluid $8$ hardly varies in the flow $17f$ of the fluid, the fluid damper $1$ demonstrates a damping effect as a fluid damper having a damping force close to a damping force based on the fundamental fluid flow resistance of the magneto-rheological fluid 8.

Figure 12B:
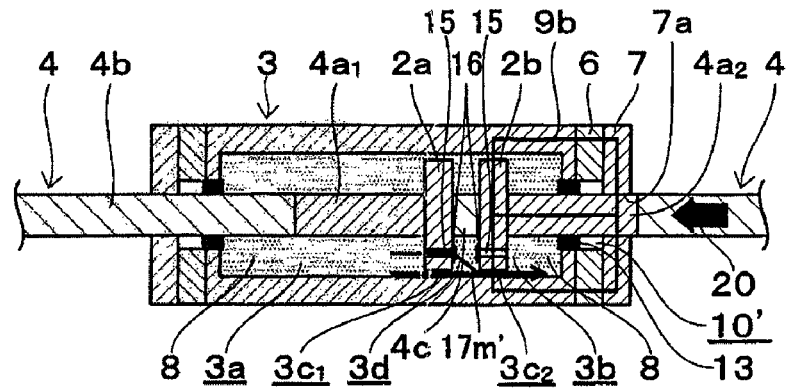
FIG. 12B is a cross-sectional view for explaining the operation of the fluid damper according to the fifth embodiment when the pistons are moving toward a first cylinder chamber side from a state where they are displaced to the second cylinder chamber side beyond a neutral region.

Subsequently, when the piston rod 4 and the pistons 2a and 2b change their direction to move in a direction of an arrow 20, i.e., toward the first cylinder chamber 3a side as shown in FIG. 12B from the state depicted in FIG. 12A, i.e., a state where the piston 2b is displaced toward the second cylinder chamber 3b side beyond the neutral region to form the magnetic circuit 9b having the high magnetic flux density, the magneto-rheological fluid 8 can flow from the first cylinder chamber 3a to the third cylinder chamber 3d via the bypass 15 of the piston 2a but cannot flow from the third cylinder chamber 3d to the second cylinder chamber 3b via the bypass 15 of the piston 2b by the function of the check valves 16 provided to the bypasses 15 of the pistons 2a and 2b.

Therefore, as indicated as a flow 17m' of the fluid in FIG. 12B, the magneto-rheological fluid 8 flows from the first cylinder chamber 3a to the third cylinder chamber 3d via the bypass 15 of the piston 2a and the orifice $3c_1$ and further flows from the third cylinder chamber 3d to the second cylinder chamber 3b via the orifice $3c_2$ in accordance with movement of the pistons 2a and 2b.

At this time, since the magnetic circuit 9b having the high magnetic flux density applies an intensive magnetic field to the magneto-rheological fluid 8 in the orifice $3c_2$ portion, the fluid flow resistance is further increased, the damping force of the fluid damper is raised, and the fluid damper 1 demonstrates the strong damping effect.

Figure 12C:
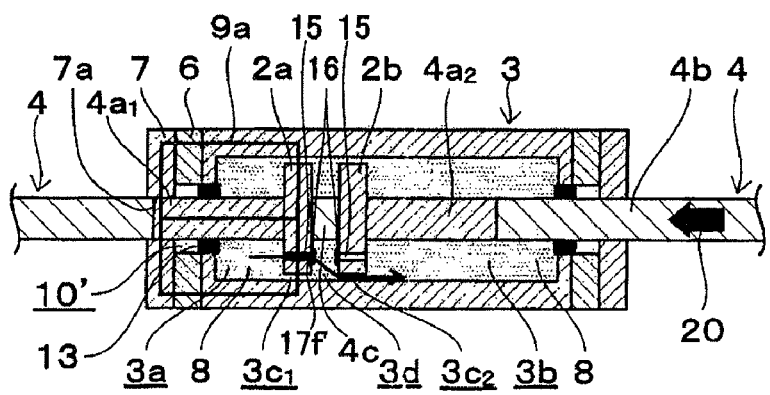
FIG. 12C is a cross-sectional view for explaining the operation of the fluid damper according to the fifth embodiment when the pistons are moving toward the first cylinder chamber side.

Further, when the piston rod 4 and the pistons 2a and 2b are further displaced toward the first cylinder chamber 3a side beyond the neutral position, as shown in FIG. 12C, the piston rod magnetic portion 4a, protrudes from the cylinder 3 to enter the through hole 7a at the central portion of the second yoke 7, thereby facilitating passage of the magnetic flux between the second yoke 7 and the piston rod magnetic portion $4a_1$. Therefore, the magnetic flux density of the magnetic circuit 9a passing through the magnetic field generation device 6, the second yoke 7, the piston rod magnetic portion $4a_1$, the piston 2a, and the cylinder 3 is increased. As a result, the intensive magnetic field is applied to the magneto-rheological fluid 8 in the orifice 3c, portion, thereby further increasing the fluid flow resistance.

On the other hand, in the piston 2a, the magnetic flux passes through a portion having a high magnetic permeability. Therefore, the magnetic field is hardly applied to the magneto-rheological fluid 8 in the bypass 15 portion through which the magnetic flux hardly passes, and the fluid flow resistance also hardly varies.

Furthermore, although the magnetic flux density of the magnetic circuit 9a connecting the members having high magnetic permeability in a minimum distance is increased, the piston rod non-magnetic portions 4b and 4c serve as gaps between the piston 2b and the magnetic field generation device 6, and the magnetic circuit passing through the piston 2b is not formed, or a magnetic flux density passing through this circuit is hardly present. Therefore, the magnetic field is hardly applied to the magneto-rheological fluid 8 in the orifice $3c_2$ portion, and the fluid flow resistance also hardly varies.

Moreover, since the fluid flow resistance in the orifice $3c_1$ portion is increased due to rise of the magnetic flux density of the magnetic circuit 9a, as indicated as a flow 17f of the fluid in FIG. 12C, the magneto-rheological fluid 8 flows from the first cylinder chamber 3a to the third cylinder chamber 3d via the bypass 15 of the piston 2a through which the magnetic flux does not pass. Additionally, the magneto-rheological fluid 8 flows from the third cylinder chamber 3d to the second cylinder chamber 3b via the orifice $3c_2$ to which the magnetic field is hardly applied.

When the pistons 2a and 2b move from the neutral position in the direction of the arrow 20, i.e., toward the first cylinder chamber 3a side in this manner, the magneto-rheological fluid 8 flows along the flow 17f of the fluid passing through the bypass 15 of the piston 2a through which the magnetic flux does not pass and the orifice $3c_2$. Further, since the fluid flow resistance of the magneto-rheological fluid 8 hardly varies in the flow 17f of the fluid, the fluid damper 1 demonstrates the damping effect as a fluid damper having a damping force close to a damping force based on the fundamental fluid flow resistance of the magneto-rheological fluid 8.

Figure 12D:
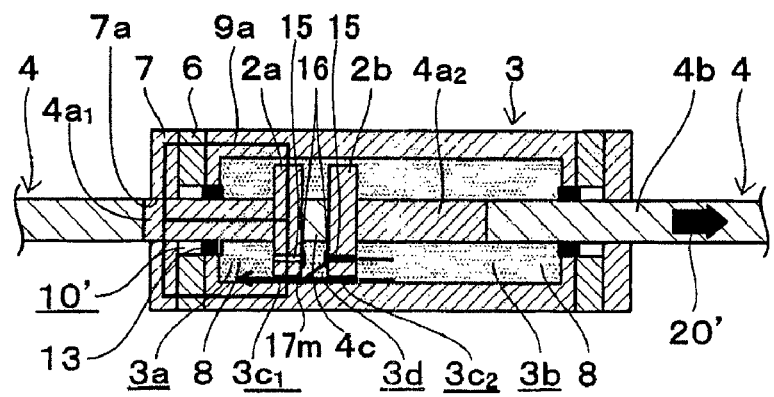
FIG. 12D is a cross-sectional view for explaining the operation of the fluid damper according to the fifth embodiment when the pistons are moving toward the second cylinder chamber side from a state where they are displaced to the first cylinder chamber side beyond the neutral region.

Then, when the piston rod 4 and the pistons 2a and 2b change their direction to move in the direction of the arrow 20', i.e., toward the second cylinder chamber 3b as shown in FIG. 12D from the state depicted in FIG. 12C, i.e., a state where the piston 2a is displaced to the first cylinder chamber 3a side beyond the neutral region to form the magnetic circuit 9a having the high magnetic flux density, the magneto-rheological fluid 8 can flow from the second cylinder chamber 3b to the third cylinder chamber 3d via the bypass 15 of the piston 2b but cannot flow from the third cylinder chamber 3d to the first cylinder chamber 3a via the bypass 15 of the piston 2a by the function of the check valves 16 provided at the bypasses 15 of the pistons 2a and 2b.

Therefore, as indicated as a flow 17m of the fluid in FIG. 12D, the magneto-rheological fluid 8 flows from the second cylinder chamber 3b to the third cylinder chamber 3d via the bypass 15 of the piston 2b and the orifice $3c_2$ and further flows from the third cylinder chamber 3d to the first cylinder chamber 3a via the orifice $3c_1$ in accordance with movement of the pistons 2a and 2b.

At this time, since the magnetic circuit 9a having the high magnetic flux density applies the intensive magnetic field to the magneto-rheological fluid 8 in the orifice $3c_1$ portion, the fluid flow resistance is further increased, the damping force of the fluid damper 1 rises, and the fluid damper 1 demonstrates the strong damping effect.

Based on the above description, how the fluid damper 1 according to this embodiment demonstrates the damping force is organized as follows. In regard to a relative displace amount X1 of the pistons 2a and 2b with respect to the cylinder 3, the relative displacement amount X1 from the neutral position toward the arrow 20' side, i.e., the second cylinder chamber 3b side is determined to be positive, and the relative displacement amount X1 from the same toward the arrow 20 side, i.e., the first cylinder chamber 3a side is determined to be negative. Further, a relative speed V1 of the pistons 2a and 2b with respect to the cylinder 3 in the direction of the arrow 20' is determined to be positive, and the same in the direction of the arrow 20 is determined to be negative. Then, the damping force of the fluid damper 1 becomes minimum when V1>0, X1>0, and V1×X1>0 as shown in FIG. 12A, the damping force becomes maximum when V1<0, X1>0, and V1×X1<0 as shown in FIG. 12B, the damping force becomes minimum when V1<0, X1<0, and V1×X1>0 as shown in FIG. 12C, and the damping force becomes maximum when V1>0, X1<0, and V1×X1<0 as shown in FIG. 12D.

That is, the fluid damper 1 according to the present invention can control a magnitude of the damping force to be demonstrated based on a relationship between the relative speed, i.e., a direction of movement of the pistons with respect to the cylinder and the relative displacement amount, i.e., a direction of displacement from the neutral position, thereby demonstrating its excellent performance of attenuating vibration.

Figure 13:
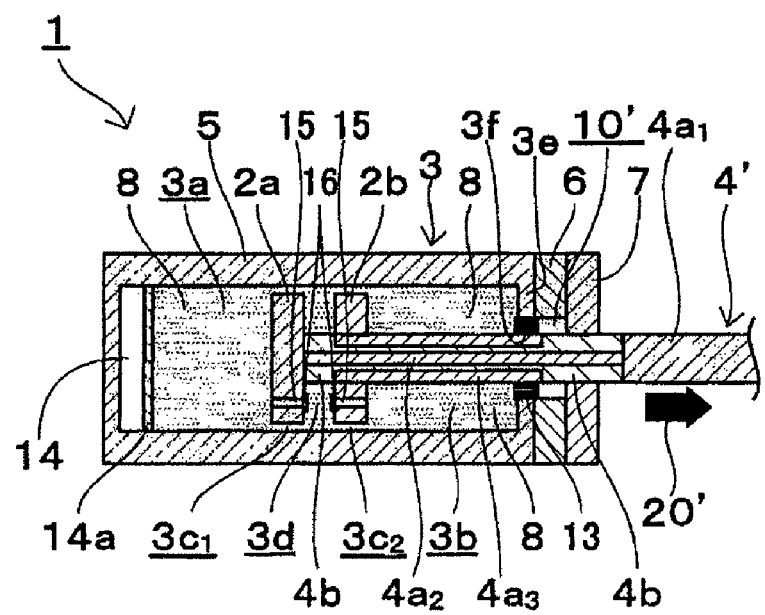
FIG. 13 is a cross-sectional view showing a sixth embodiment of the fluid damper according to the present invention.

Furthermore, FIGS. 13 to 15 show a sixth embodiment of the fluid damper according to the present invention. In a fluid damper 1 according to this embodiment, the piston rod according to the fifth embodiment depicted in FIG. 12 is modified to a cantilevered type, and this fluid damper 1 has a one-sided rod 4' that pierces an end face member 3e of a cylinder 3 on one side in an axial direction to support pistons 2a and 2b from one side, a magnetic field generation device 6 provided outside the cylinder 3, and a second yoke 7 arranged around the one-sided rod 4' outside the cylinder 3. It is to be noted that the first and second pistons 2a and 2b formed of a magnetic material will be referred to as pistons 2a and 2b hereinafter, respectively.

It is to be noted that, in this fluid damper 1 using the one-sided rod 4', an accumulator 14 having a free piston 14a is provided in a cylinder chamber of the cylinder 3 in order to cope with a change in a volume of the one-sided rod 4' that enters the cylinder chamber of the cylinder 3.

Moreover, like the fifth embodiment, the piston 2a on the first cylinder chamber 3a side includes a bypass 15 that allows the first cylinder chamber 3a to communicate with a third cylinder chamber 3d and allows a magneto-rheological fluid 8 to pass therethrough. Additionally, the piston 2a includes a check valve 16 at the bypass 15, the check valve 16 allowing the magneto-rheological fluid 8 to pass in a direction from the first cylinder chamber 3a to the third cylinder chamber 3d alone. Further, the piston 2b on the second cylinder chamber 3b side includes the bypass 15 that allows a second cylinder chamber 3b to communicate with the third cylinder chamber 3d and allows the magneto-rheological fluid 8 to pass therethrough. Furthermore, the piston 2b includes the check valve 16 at the bypass 15, the check valve 16 allowing the magneto-rheological fluid 8 to pass in a direction from the second cylinder chamber 3b to the third cylinder chamber 3d alone.

Moreover, in this embodiment, the one-sided rod 4' has piston rod magnetic portions $4a_1$ and $4a_2$ that form a first magnetic circuit 9a together with the piston 2a, the cylinder 3, the magnetic field generation device 6, and the second yoke 7 when the piston 2a is displaced toward the first cylinder chamber 3a side beyond a neutral region, and a piston rod magnetic portion $4a_3$ that forms a second magnetic circuit 9b together with the piston 2b, the cylinder 3, the magnetic field generation device 6, and the second yoke 7 when the piston 2b is displaced toward the second cylinder chamber 3b side beyond the neutral region. It is to be noted that the piston 2a and the piston rod magnetic portions $4a_1$ and $4a_2$ that form the first magnetic circuit 9a are magnetically coupled with each other, and the piston 2b and the piston rod magnetic portion $4a_3$ that form the second magnetic circuit 9b are magnetically coupled with each other.

The one-sided rod 4' further has piston rod non-magnetic portion 4b that cuts off the first magnetic circuit 9a when the piston 2a is in the neutral region and cuts off the second magnetic circuit 9b when the piston 2b is in the neutral region.

The piston rod non-magnetic portion 4b is arranged between the piston rod magnetic portion $4a_1$ and the piston rod magnetic portion $4a_3$ and between the piston rod magnetic portion $4a_2$ and the piston rod magnetic portion $4a_3$ so that the magnetic circuits are not formed or the magnetic circuits hardly having a magnetic flux density are formed between the piston rod magnetic portion $4a_1$ forming the first magnetic circuit 9a and the piston rod magnetic portion $4a_3$ forming the second magnetic circuit 9b and between the piston rod magnetic portion $4a_2$ forming the first magnetic circuit 9a and the piston rod magnetic portion $4a_3$ forming the second magnetic circuit 9b. Additionally, the pistons 2a and 2b are consequently magnetically separated from each other.

In this embodiment, the cylinder 3 has a through hole 3f that the one-sided rod 4' pierces at the center of an end face member 3e on one side in the axial direction. Further, an end portion of the cylinder 3 on the opposite side in the axial direction with respect to the end face member 3e that the one-sided rod 4' pierces is closed.

Furthermore, an arrangement of the piston rod magnetic portions $4a_1$ and $4a_3$ and the piston rod non-magnetic portion 4b is set in such a manner that the piston rod non-magnetic portion 4b is present between the piston rod magnetic portions $4a_1$ and $4a_3$ and the second yoke 7 as a gap that cuts off the magnetic circuit when the pistons 2a and 2b are in the neutral region and that the piston rod non-magnetic portion 4b does not function as a gap between the piston rod magnetic portions $4a_1$ and $4a_3$ and the second yoke 7 when the pistons 2a and 2b are displaced beyond the neutral region.

An operation of the fluid damper 1 according to the sixth embodiment will now be explained.

As shown in FIG. 13, when the pistons 2a and 2b are placed at a neutral position, the piston rod non-magnetic portion 4b is interposed between the second yoke 7 and the piston rod magnetic portions $4a_1$ and $4a_3$ to serve as the gap on the magnetic circuit. Therefore, the magnetic circuit passing through the magnetic field generation device 6, the second yoke 7, the piston rod magnetic portions $4a_1$ and $4a_3$, the pistons 2a and 2b, and the cylinder 3 is not formed or hardly has a magnetic flux density passing therethrough. Therefore, a magnetic field is hardly applied to the magneto-rheological fluid 8 in portions of orifice portions $3c_1$ and $3c_2$, and hence a fluid flow resistance also hardly varies.

In this state, when a vibration force in a direction of an arrow 20' is applied to the one-sided rod 4', the one-sided rod 4' and the pistons 2a and 2b move in the direction of the arrow 20'.

At this time, by the function of the check valves 16 provided to the bypasses 15 of the pistons 2a and 2b, the magneto-rheological fluid 8 can flow from the second cylinder chamber 3b to the third cylinder chamber 3d through the bypass 15 of the piston 2b but cannot flow from the third cylinder chamber 3d to the first cylinder chamber 3a through the bypass 15 of the piston 2a.

Therefore, the magneto-rheological fluid 8 flows from the second cylinder chamber 3b to the third cylinder chamber 3d via the bypass 15 of the piston 2b and the orifice $3c_2$ and further flows from the third cylinder chamber 3d to the first cylinder chamber 3a via the orifice $3c_1$ in accordance with movement of the pistons 2a and 2b.

At this time, since the magnetic field is hardly applied to the magneto-rheological fluid 8 in the portions of the orifices $3c_1$ and $3c_2$ and the fluid flow resistance also hardly varies when the pistons 2a and 2b are placed at the neutral position, the fluid damper 1 demonstrates a damping effect as a fluid damper having a damping force close to a damping force based on the fundamental fluid flow resistance of the magneto-rheological fluid 8 on an initial stage of movement of the pistons 2a and 2b.

Figure 14A:
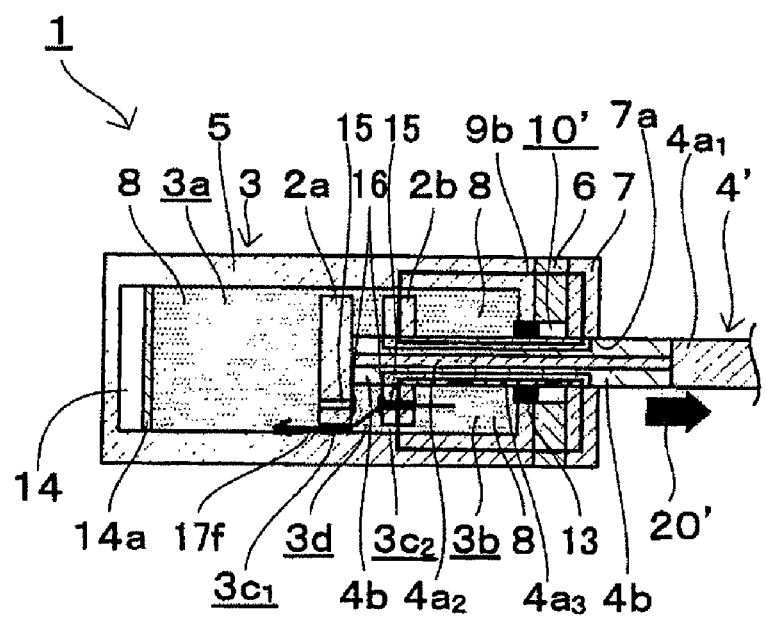
FIG. 14A is a cross-sectional view for explaining an operation of the fluid damper according to the sixth embodiment when pistons are moving toward a second cylinder chamber side.

Moreover, when the one-sided rod 4' and the pistons 2a and 2b are displaced in the direction of the arrow 20', i.e., toward the second cylinder chamber 3b side, as shown in FIG. 14A, the piston rod magnetic portion $4a_3$ protrudes from the cylinder 3 to enter the through hole 7a at the central portion of the second yoke 7, thereby facilitating passage of a magnetic flux between the second yoke 7 and the piston rod magnetic portion $4a_3$. Therefore, the magnetic flux density of the magnetic circuit $9b$ passing through the magnetic field generation device 6, the second yoke 7, the piston rod magnetic portion $4a_3$, the piston $2b$, and the cylinder 3 is increased. As a result, the intensive magnetic field is applied to the magneto-rheological fluid 8 in the orifice $3c_2$ portion, and the fluid flow resistance is further increased.

On the other hand, in the piston $2b$, the magnetic flux passes through a portion with a high magnetic permeability. Therefore, the magnetic field is hardly applied to the magneto-rheological fluid 8 in the bypass 15 portion through which the magnetic flux hardly passes, and the fluid flow resistance also hardly varies.

Additionally, although the magnetic flux density of the magnetic circuit $9b$ connecting the members having the high magnetic permeability in a minimum distance is increased, the piston rod non-magnetic portion $4b$ functions as a gap between the piston $2a$ and the magnetic field generation device 6, and the magnetic circuit passing through the piston $2a$ is not formed or hardly has the magnetic flux density passing therethrough. Therefore, the magnetic field is hardly applied to the magneto-rheological fluid 8 in the orifice $3c_1$ portion, and the fluid flow resistance also hardly varies.

Further, since the fluid flow resistance in the orifice $3c_2$ portion is increased due to rise of the magnetic flux density of the magnetic circuit $9b$, as indicated as a flow $17f$ of the fluid in FIG. 14A, the magneto-rheological fluid 8 flows to the third cylinder chamber $3d$ via the bypass 15 of the piston $2b$ through which the magnetic flux does not pass. Furthermore, the magneto-rheological fluid 8 flows from the third cylinder chamber $3d$ to the first cylinder chamber $3a$ via the orifice $3c$, to which the magnetic field is hardly applied.

When the pistons $2a$ and $2b$ move from the neutral position in the direction of the arrow 20', i.e., toward the second cylinder chamber $3b$ side in this manner, the magneto-rheological fluid 8 flows along the flow $17f$ of the fluid passing through a fluid bypass 7 of the piston $2b$ through which the magnetic flux does not pass and the orifice $3c_1$. Moreover, since the fluid flow resistance of the magneto-rheological fluid 8 hardly varies in the flow $17f$ of the fluid, the fluid damper 1 demonstrates a damping effect as a fluid damper having a damping force close to a damping force based on the fundamental fluid flow resistance of the magneto-rheological fluid 8.

Figure 14B:
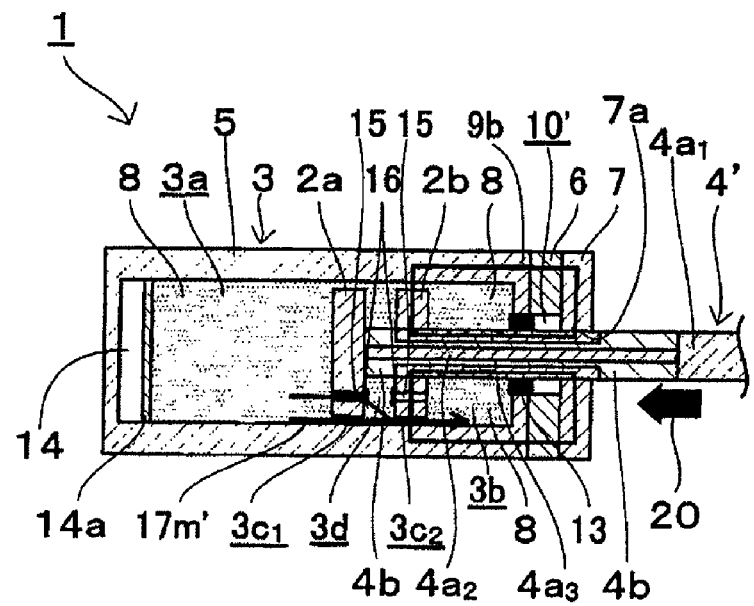
FIG. 14B is a cross-sectional view for explaining the operation of the fluid damper according to the sixth embodiment when the pistons are moving toward the first cylinder chamber side from a state where they are displaced to the second cylinder chamber side beyond a neutral region.

Then, when the one-sided rod 4' and the pistons $2a$ and $2b$ change their direction to move in the direction of the arrow 20, i.e., toward the first cylinder chamber $3a$ side as shown in FIG. 14B from the state depicted in FIG. 14A, i.e., a state where the piston $2b$ is displaced toward the second cylinder chamber $3b$ side beyond the neutral region to form the magnetic circuit $9b$ having the high magnetic flux density, the magneto-rheological fluid 8 can flow from the first cylinder chamber $3a$ to the third cylinder chamber $3d$ via the bypass 15 of the piston $2a$ but cannot flow from the third cylinder chamber $3d$ to the second cylinder chamber $3b$ via the bypass 15 of the piston $2b$ by the function of the check valves 16 provided to the bypasses 15 of the pistons $2a$ and $2b$.

Therefore, as indicated as a flow $17m'$ of the fluid in FIG. 14B, the magneto-rheological fluid 8 flows from the first cylinder chamber $3a$ to the third cylinder chamber $3d$ via the bypass 15 of the piston $2a$ and the orifice $3c_1$ and further flows from the third cylinder chamber $3d$ to the second cylinder chamber $3b$ via the orifice $3c_2$ in accordance with movement of the pistons $2a$ and $2b$.

At this time, since the magnetic circuit $9b$ having the high magnetic flux density applies the intensive magnetic field to the magneto-rheological fluid 8 in the orifice $3c_2$ portion, the fluid flow resistance of the magneto-rheological fluid 8 is further increased, the damping force of the fluid damper 1 rises, and the fluid damper 1 demonstrates the strong damping effect.

Figure 15A:
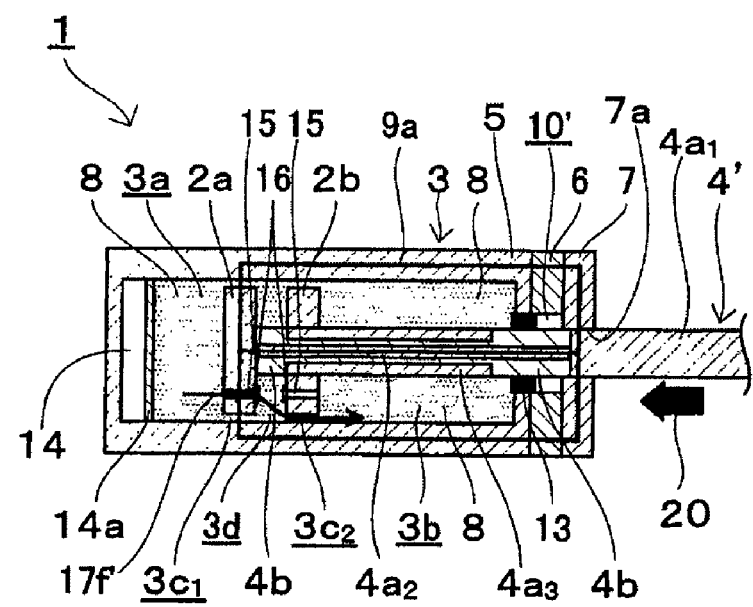
FIG. 15A is a cross-sectional view for explaining the operation of the fluid damper according to the sixth embodiment when the pistons are moving toward the first cylinder chamber side.

Further, when the one-sided rod 4' and the pistons $2a$ and $2b$ are further displaced toward the first cylinder chamber $3a$ side beyond the neutral position, as shown in FIG. 15A, the piston rod magnetic portion $4a$, enters the through hole $7a$ at the central portion of the second yoke 7, thereby facilitating passage of the magnetic flux between the second yoke 7 and the piston rod magnetic portion $4a_1$. Therefore, the magnetic flux density of the magnetic circuit $9a$ passing through the magnetic field generation device 6, the second yoke 7, the piston rod magnetic portions $4a_1$ and $4a_2$, the piston $2a$, and the cylinder 3 is increased. As a result, the intensive magnetic field is applied to the magneto-rheological fluid 8 at the orifice $3c$, portion, and the fluid flow resistance further rises.

On the other hand, in the piston $2a$, the magnetic flux passes through a portion having a high magnetic permeability. Therefore, the magnetic field is hardly applied to the magneto-rheological fluid 8 in the bypass 15 portion through which the magnetic flux does not pass, and the fluid flow resistance also hardly varies.

Furthermore, although the magnetic flux density of the magnetic circuit $9a$ connecting the members having the high magnetic permeability in a minimum distance is increased, the piston rod non-magnetic portion $4b$ serves as a gap between the piston $2b$ and the magnetic field generation device 6, and the magnetic circuit passing through the piston $2b$ is not formed or hardly has the magnetic flux density passing therethrough. Therefore, the magnetic field is hardly applied to the magneto-rheological fluid 8 in the orifice $3c_2$ portion, and the fluid flow resistance also hardly varies.

Moreover, since the fluid flow resistance in the orifice $3c_1$ portion is increased with rise of the magnetic flux density of the magnetic circuit $9a$, as indicated as a flow $17f'$ of the fluid in FIG. 15A, the magneto-rheological fluid 8 flows from the first cylinder chamber $3a$ to the third cylinder chamber $3d$ via the bypass 15 of the piston $2a$ through which the magnetic flux does not pass. Additionally, the magneto-rheological fluid 8 flows from the third cylinder chamber $3d$ to the second cylinder chamber $3b$ via the orifice $3c_2$ to which the magnetic field is hardly applied.

When the pistons $2a$ and $2b$ move from the neutral position in the direction of the arrow 20, i.e., toward the first cylinder chamber $3a$ side, the magneto-rheological fluid 8 flows along the flow $17f'$ of the fluid passing through the bypass 15 of the piston $2a$ that the magnetic flux does not pass through and the orifice $3c_2$. Further, since the fluid flow resistance of the magneto-rheological fluid 8 hardly varies in the flow $17f'$ of the fluid, the fluid damper 1 demonstrates the damping effect as a fluid damper having a damping force close to a damping force based on the fundamental fluid flow resistance of the magneto-rheological fluid 8.

Figure 15B:
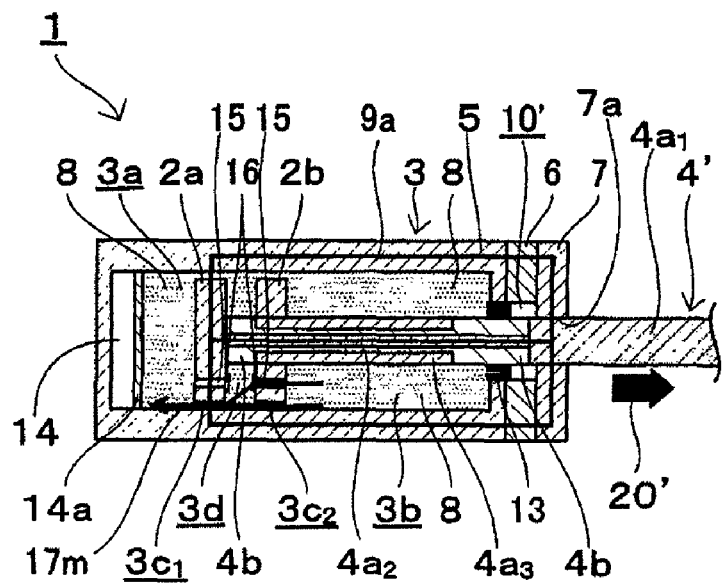
FIG. 15B is a cross-sectional view for explaining the operation of the fluid damper according to the sixth embodiment when the pistons are moving toward the second cylinder chamber side from a state where they are displaced to the first cylinder chamber side beyond the neutral region.

Then, when the one-sided rod 4' and the pistons $2a$ and $2b$ change their direction to move in a direction of an arrow 20', i.e., toward the second cylinder chamber $3b$ side as shown in FIG. 15B from the state depicted in FIG. 15A, i.e., the state where the piston $2a$ is displaced toward the first cylinder chamber $3a$ side beyond the neutral region to form the magnetic circuit $9a$ having the high magnetic flux density, the magneto-rheological fluid 8 can flow from the second cylinder chamber $3b$ to the third cylinder chamber $3d$ via the bypass 15 of the piston $2b$ but cannot flow from the third cylinder chamber $3d$ to the first cylinder chamber $3a$ via the bypass 15 of the piston $2a$ by the function of the check valves 16 provided to the bypasses 15 of the pistons $2a$ and $2b$.

Therefore, as indicated as a flow $17m$ of the fluid in FIG. 15B, the magneto-rheological fluid 8 flows from the second cylinder chamber 3b to the third cylinder chamber 3d via the bypass 15 of the piston 2b and the orifice $3c_2$ and further flows from the third cylinder chamber 3d to the first cylinder chamber 3a via the orifice $3c_1$ in accordance with movements of the pistons 2a and 2b.

At this time, since the magnetic circuit 9a having the high magnetic flux density applies the intensive magnetic field to the magneto-rheological fluid 8 in the orifice $3c_1$ portion, the fluid flow resistance is further increased, the damping force of the fluid damper 1 rises, and the fluid damper 1 demonstrates the strong damping effect.

Based on the above description, the damping force of the fluid damper 1 according to this embodiment becomes minimum when V1>0, X1>0, and V1×X1>0 as shown in FIG. 14A, the damping force becomes maximum when V1<0, X1>0, and V1×X1<0 as shown in FIG. 14B, the damping force becomes minimum when V1<0, X1<0, and V1×X1>0 as shown in FIG. 15A, and the damping force becomes maximum when V1>0, X1<0, and V1×X1<0 as shown in FIG. 15B.

That is, according to the fluid damper 1 of this embodiment even though it is the one-sided rod damper, when the pistons are displaced to one of two sides in the axial direction to move out of the neutral region, the magnetic circuit passing through one of the pair of pistons is formed based on functions of the bypasses and the valves respectively provided to the pair of pistons in accordance with a displacement position of the pistons. As a result, a magnitude of the damping force to be demonstrated can be controlled based on a relationship between a relative speed, i.e., a direction of movement of the pistons with respect to the cylinder and a relative displacement amount, i.e., a direction of displacement from the neutral position, thereby demonstrating its excellent performance of attenuating vibration.

Further, since the one-sided rod is provided, the damper can be reduced in size, or this rod can be utilized for an intended purpose using the one-sided rod damper alone, and hence it can be used for various applications.

Figure 16:
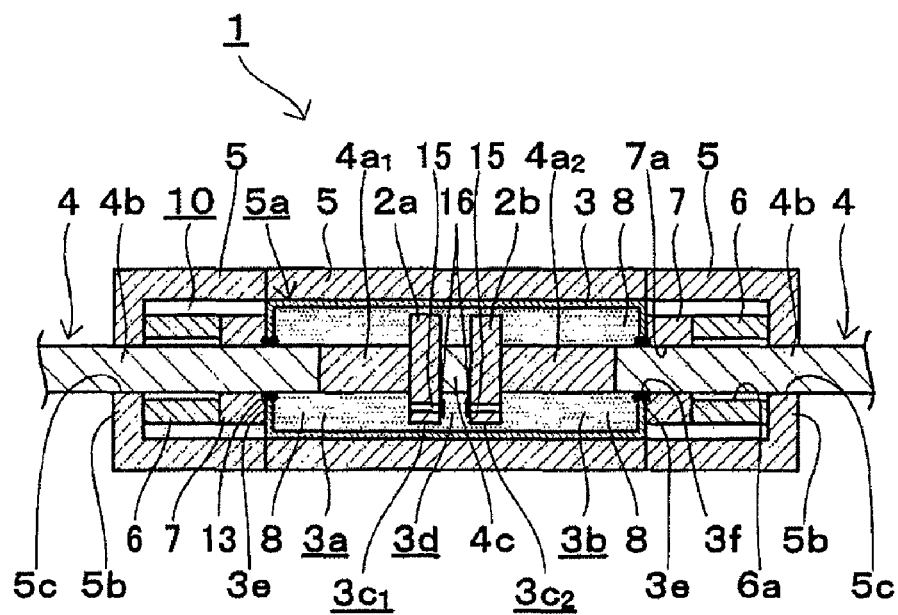
FIG. 16 is a cross-sectional view showing a seventh embodiment of the fluid damper according to the present invention.

Further, FIG. 16 shows a seventh embodiment of the fluid damper according to the present invention. A fluid damper 1 according to this embodiment is an example where the cylinder 3 and the first yoke 5 in the fifth embodiment are formed of different members.

This fluid damper 1 according to the seventh embodiment also demonstrates a damping force by using the same mechanism as that in the first embodiment, and can control a magnitude of the damping force to be demonstrated based on a relationship between a direction of movement of pistons with respect to a cylinder and a direction of displacement from a neutral position and demonstrate an excellent damping effect.

Figure 17:
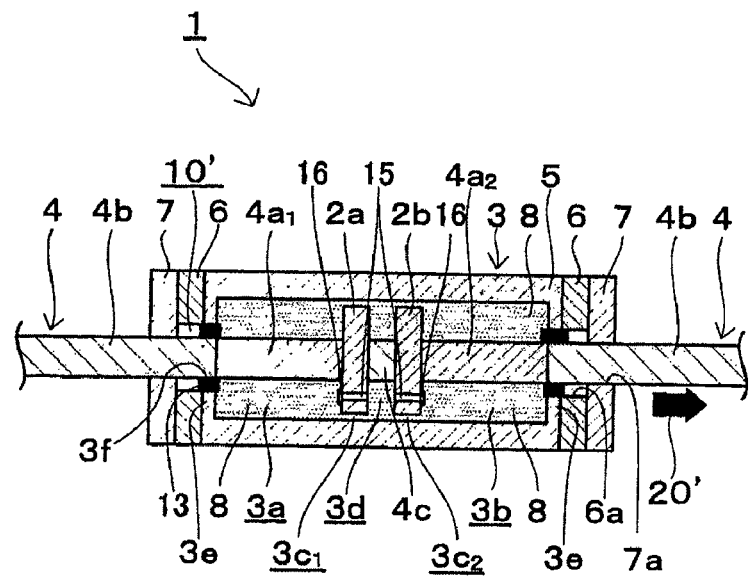
FIG. 17 is a cross-sectional view showing an eighth embodiment of the fluid damper according to the present invention.
Figure 18:
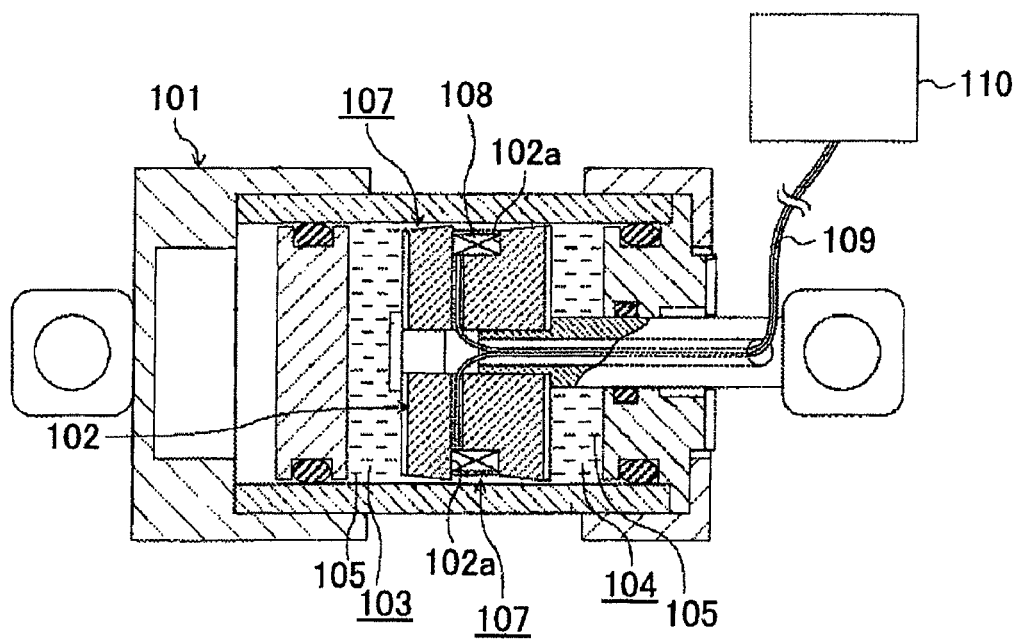
FIG. 18 is a cross-sectional view showing a conventional fluid damper.

Furthermore, FIG. 17 shows an eighth embodiment of the fluid damper according to the present invention. A fluid damper 1 according to this embodiment sets the check valves 16 in the fifth embodiment to function in opposite directions to change a flow of the magneto-rheological fluid 8.

Specifically, in this embodiment, a piston 2a includes at a bypass 15 a check valve 16 allowing a magneto-rheological fluid 8 to pass therethrough in a direction from a third cylinder chamber 3d to a first cylinder chamber 3a alone. Moreover, a piston 2b includes at a bypass 15 a check valve 16 allowing the magneto-rheological fluid 8 to pass therethrough in a direction from the third cylinder chamber 3d to a second cylinder chamber 3b alone.

According to such a structure, when the pistons 2a and 2b move toward the second cylinder chamber 3b side, i.e., in a direction of an arrow 20' in FIG. 17, the magneto-rheological fluid 8 flows from the second cylinder chamber 3b to the third cylinder chamber 3d via an orifice $3c_2$ and further flows to the first cylinder chamber 3a through the bypass 15 of the piston 2a and an orifice $3c_1$. Further, when the piston 2b is displaced toward the second cylinder chamber 3b side beyond a neutral region, a magnetic circuit passing through a magnetic field generation device 6, a second yoke 7, a piston rod magnetic portion $4a_2$, the piston 2b, and a cylinder 3 is formed, and a magnetic flux density passing therethrough is increased. As a result, an intensive magnetic field is applied to the magneto-rheological fluid 8 in the orifice $3c_2$ portion, a fluid flow resistance is further increased, a damping force of the fluid damper 1 rises, and the fluid damper 1 demonstrates a strong damping effect.

Furthermore, when the pistons 2a and 2b change their direction to move toward the first cylinder chamber 3a side from a state where the piston 2b is displaced toward the second cylinder chamber 3b side beyond the neutral region to form the magnetic circuit having the high magnetic field density, the magneto-rheological fluid 8 flows from the first cylinder chamber 3a to the third cylinder chamber 3d via the orifice $3c_1$ and further flows to the second cylinder chamber 3b via the bypass 15 of the piston 2b and the orifice $3c_2$. Therefore, since the magneto-rheological fluid 8 flows through the orifice $3c_1$, the bypass 15 of the piston 2b, and the orifice $3c_2$ to which a magnetic field is hardly applied, the fluid flow resistance hardly varies, and the fluid damper 1 demonstrates the damping effect as a fluid damper having a damping force close to a damping force based on the fundamental fluid flow resistance of the magneto-rheological fluid 8.

Moreover, when the piston 2a is displaced toward the first cylinder chamber 3a side beyond the neutral region, a magnetic circuit passing through the magnetic field generation device 6, the second yoke 7, the piston rod magnetic portion $4a_1$, the piston 2, and the cylinder 3 is formed, and the magnetic flux density is gradually increased. As a result, the intensive magnetic field is applied to the magneto-rheological fluid 8 in the orifice $3c_1$ portion, the fluid flow resistance is further increased, the damping force of the fluid damper 1 rises, and the fluid damper 1 demonstrates the strong damping effect.

Additionally, when the pistons 2a and 2b change their direction to move toward the second cylinder chamber 3b side, the magneto-rheological fluid 8 flows from the second cylinder chamber 3b to the third cylinder chamber 3d via the orifice $3c_2$ and further flows to the first cylinder chamber 3a via the bypass 15 of the piston 2a and the orifice $3c_1$. At this time, when the piston 2a is present in a region close to the first cylinder chamber 3a apart from the neutral region, the magneto-rheological fluid 8 flows through the orifice $3c_2$, the bypass 15 of the piston 2a, and the orifice $3c_1$ to which the magnetic field is hardly applied, and hence the fluid flow resistance hardly varies, and the fluid damper 1 demonstrates the damping effect as a fluid damper having a damping force close to a damping force based on the fundamental fluid flow resistance of the magneto-rheological fluid 8.

Based on the above description, the damping force of the fluid damper 1 according to this embodiment becomes maximum when V1>0, X1>0, and V1×X1>0, the damping force becomes minimum when V1<0, X1>0, and V1×X1<0, the damping force becomes maximum when V1<0, X1<0, and V1×X1>0, and the damping force becomes minimum when V1>0, X1<0, and V1×X1<0.

That is, the fluid damper 1 according to the present invention can likewise control a magnitude of the damping force to be demonstrated based on a relationship between a relative speed, i.e., a direction of movement of the pistons with respect to the cylinder and a relative displacement amount, i.e., a direction of displacement from the neutral position, thereby demonstrating its excellent performance of attenuating vibration.

It is to be noted that the foregoing embodiments are preferred embodiments of the present invention, but the present invention is not restricted thereto, and various modifications can be carried out without departing from the scope of the present invention.

The invention claimed is:

1. A fluid damper comprising: a fluid having magnetic properties, a piston formed of a magnetic material; a cylinder which encapsulates the fluid having magnetic properties and accommodates the piston; a piston rod which pierces an end face member of the cylinder in an axial direction to support the piston; a magnetic field generation device provided outside the cylinder; a first yoke which is arranged around the cylinder and magnetically connects the piston with the magnetic field generation device; and a second yoke which is arranged around the piston rod outside the cylinder and magnetically connects the piston rod with the magnetic field generation device, wherein the piston rod has: a magnetic portion which forms a first magnetic circuit together with the piston, the first yoke, the magnetic field generation device, and the second yoke when the piston is displaced to one side in the axial direction beyond a neutral region; a magnetic portion which forms a second magnetic circuit together with the piston, the first yoke, the magnetic field generation device, and the second yoke when the piston is displaced to the other side in the axial direction beyond the neutral region; and a non-magnetic portion which cuts off the first magnetic circuit and the second magnetic circuit when the piston is in the neutral region, and a magnetic flux density of each magnetic circuit passing through a gap between an outer peripheral surface of the piston and an inner peripheral surface of the cylinder varies in accordance with movement of the piston in the axial direction.

2. The fluid damper according to claim 1, wherein the piston formed of a magnetic material is constituted of at least a pair of first and second pistons formed of a magnetic material which are arranged to face each other through a non-magnetic material with a gap therebetween in the axial direction, and the first and second pistons formed of a magnetic material have bypasses allowing the fluid having magnetic properties to flow therethrough only in directions opposite to each other.

3. The fluid damper according to claim 2, wherein a cylinder chamber of the cylinder is partitioned by the pair of pistons into a first cylinder chamber, a second cylinder chamber, and a third cylinder chamber sandwiched between the pair of pistons, the first piston on the first cylinder chamber side includes a valve which allows the fluid having magnetic properties to flow only in a direction from the first cylinder chamber to the third cylinder chamber at one of said bypasses allowing the first cylinder chamber to communicate with the third cylinder chamber, the second piston on the second cylinder chamber side includes a valve which allows the fluid having magnetic properties to flow only in a direction from the second cylinder chamber to the third cylinder chamber at another of said bypasses allowing the second cylinder chamber to communicate with the third cylinder chamber, and the piston rod has: a magnetic portion which forms a first magnetic circuit together with the first piston, the first yoke, the magnetic field generation device, and the second yoke when the first piston is displaced toward the first cylinder chamber side beyond a neutral region; a magnetic portion which forms a second magnetic circuit together with the second piston, the first yoke, the magnetic field generation device, and the second yoke when the second piston is displaced toward the second cylinder chamber side beyond the neutral region; and a non-magnetic portion which cuts off the first magnetic circuit when the first piston is in the neutral region and cuts off the second magnetic circuit when the second piston is in the neutral region.

4. The fluid damper according to claim 2, wherein a cylinder chamber of the cylinder is partitioned by the pair of pistons into a first cylinder chamber, a second cylinder chamber, and a third cylinder chamber sandwiched between the pair of pistons, the first piston on the first cylinder chamber side includes a valve which allows the fluid having magnetic properties to flow only in a direction from the third cylinder chamber to the first cylinder chamber at one of said bypasses allowing the first cylinder chamber to communicate with the third cylinder chamber, the second piston on the second cylinder chamber side includes a valve which allows the fluid having magnetic properties to flow only in a direction from the third cylinder chamber to the second cylinder chamber at another of said bypasses allowing the second cylinder chamber to communicate with the third cylinder chamber, and the piston rod has: a magnetic portion which forms a first magnetic circuit together with the first piston, the first yoke, the magnetic field generation device, and the second yoke when the first piston is displaced toward the first cylinder chamber side beyond a neutral region; a magnetic portion which forms a second magnetic circuit together with the second piston, the first yoke, the magnetic field generation device, and the second yoke when the second piston is displaced toward the second cylinder chamber side beyond the neutral region; and a non-magnetic portion which cuts off the first magnetic circuit when the first piston is in the neutral region and cuts off the second magnetic circuit when the second piston is in the neutral region.

5. The fluid damper according to claim 1, wherein a magneto-rheological fluid is used as the fluid having magnetic properties.

6. The fluid damper according to claim 1, wherein a magnetic fluid is used as the fluid having magnetic properties.

7. The fluid damper according to claim 1, wherein a permanent magnet is used as the magnetic generation device.

8. The fluid damper according to claim 1, wherein a solenoid is used as the magnetic field generation device.

* * * * *